United States Patent
Cox, Jr. et al.

(10) Patent No.: US 9,016,653 B1
(45) Date of Patent: Apr. 28, 2015

(54) MOLDED EQUIPMENT PAD WITH ARC-SHAPED RIBS

(71) Applicant: Diversitech Corporation, Duluth, GA (US)

(72) Inventors: Charles Walter Cox, Jr., Lawrenceville, GA (US); Keith Platt, Snellville, GA (US); Jonathan Sada, Decatur, GA (US)

(73) Assignee: Diversitech Corporation, Duluth, GA (US)

( * ) Notice: Subject to any disclaimer, the term of this patent is extended or adjusted under 35 U.S.C. 154(b) by 66 days.

(21) Appl. No.: 13/874,727

(22) Filed: May 1, 2013

Related U.S. Application Data

(60) Provisional application No. 61/641,937, filed on May 3, 2012.

(51) Int. Cl.
  F16M 5/00 (2006.01)
  F16M 9/00 (2006.01)
  F24F 13/32 (2006.01)
  F16M 13/00 (2006.01)

(52) U.S. Cl.
  CPC ...... *F16M 13/00* (2013.01); *B65D 2519/00318* (2013.01); *B65D 2519/00288* (2013.01); *B65D 2519/00069* (2013.01); *F16M 5/00* (2013.01); *F16M 9/00* (2013.01); *F24F 13/32* (2013.01)

(58) Field of Classification Search
  CPC ............ F24F 13/32; F16M 5/00; F16M 9/00; B65D 19/002; B65D 2519/00069; B65D 2519/00288; B65D 2519/00318; B65D 2519/00407
  USPC .............. 248/346.02, 678, 346.01, 676, 903; 206/389, 391; 52/292, 309.1, 197
  See application file for complete search history.

(56) References Cited

U.S. PATENT DOCUMENTS

| | | | | |
|---|---|---|---|---|
| 1,528,963 | A | * 3/1925 | Adams et al. | 429/241 |
| 3,702,100 | A | 11/1972 | Wharton | |
| 4,189,125 | A | * 2/1980 | Little | 248/346.02 |
| 255,744 | A | 7/1980 | Dekko | |
| 4,287,693 | A | 9/1981 | Collette | |
| 4,562,718 | A | 1/1986 | Dunk | |
| 4,991,811 | A | * 2/1991 | Portnoy | 248/346.01 |
| 5,076,534 | A | 12/1991 | Adam | |
| 5,303,669 | A | 4/1994 | Szekely | |
| 5,344,013 | A | * 9/1994 | Born et al. | 206/391 |
| 5,419,524 | A | 5/1995 | Evans et al. | |
| 5,709,367 | A | 1/1998 | Heintz et al. | |
| 5,816,554 | A | 10/1998 | McCracken | |
| 5,895,025 | A | 4/1999 | Alesi et al. | |
| 5,961,093 | A | * 10/1999 | Jones et al. | 248/678 |
| 6,289,823 | B1 | 9/2001 | Koefelda et al. | |
| 6,352,757 | B1 | 3/2002 | Kessler et al. | |
| 6,370,831 | B1 | 4/2002 | Marshall et al. | |

(Continued)

*Primary Examiner* — Tan Le
(74) *Attorney, Agent, or Firm* — Smith Gambrell & Russell LLP

(57) ABSTRACT

A molded equipment pad having a top deck, side walls, underlying reinforcing radial ribs, and underlying reinforcing arc-shaped ribs. The arc-shaped ribs may include a series of concentric arc-shaped ribs that are centered on the center of the equipment pad and that extend toward the side walls of the pad and a number of distributed circular hubs. Alternatively, the arc-shaped ribs may include a series of concentric arc-shaped ribs that are centered on the center of the equipment pad that end short of the side walls, a series of opposing arc-shaped ribs that are centered on the corners of the equipment pad, and a number of distributed circular hubs.

13 Claims, 27 Drawing Sheets

(56) References Cited

U.S. PATENT DOCUMENTS

| | | |
|---|---|---|
| 6,605,333 B2 | 8/2003 | Ferreira et al. |
| 6,631,878 B1 | 10/2003 | Adam |
| 6,655,648 B2 | 12/2003 | Harris |
| 6,886,475 B2 | 5/2005 | Apps et al. |
| 7,008,686 B1 | 3/2006 | Rogers |
| 8,006,443 B2 | 8/2011 | Fuccella et al. |
| 8,152,129 B2 * | 4/2012 | Hermans et al. ............... 248/678 |
| 2004/0134820 A1 * | 7/2004 | Katayama ..................... 206/389 |
| 2004/0266619 A1 | 12/2004 | Bernas et al. |
| 2005/0040308 A1 * | 2/2005 | Sweeney et al. ......... 248/346.02 |
| 2005/0193927 A1 | 9/2005 | Herring et al. |
| 2007/0193133 A1 | 8/2007 | Krupnick |
| 2009/0031658 A1 | 2/2009 | Moller, Jr. et al. |

\* cited by examiner

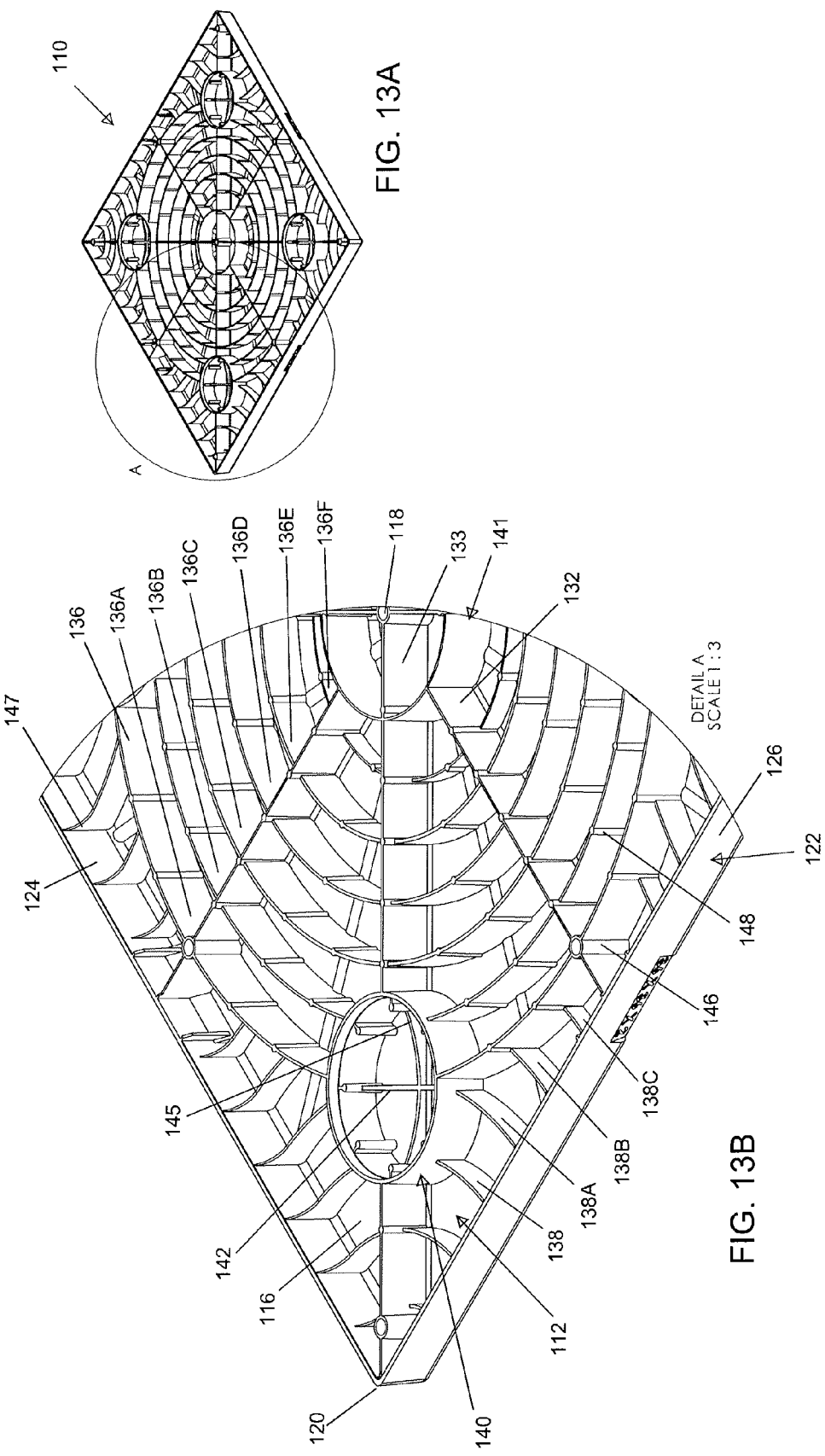

MOLDED EQUIPMENT PAD WITH ARC-SHAPED RIBS

CROSS REFERENCE TO RELATED PATENT APPLICATIONS

This invention claims priority from U.S. Provisional Patent Application No. 61/641,937, filed May 3, 2012, which is hereby incorporated by reference.

FIELD OF THE INVENTION

This invention relates to equipment pads, and more specifically to a molded equipment pad with underlying reinforcing arc-shaped ribs.

BACKGROUND OF THE INVENTION

Molded equipment pads are molded using thermoplastic, thermoset, and concrete materials and are designed to support heavy equipment, such as an air conditioning unit. In connection with such a molded equipment pad, the equipment pad must be designed with sufficient strength to support the heavy equipment while at the same time minimizing the amount of material used in the manufacturing of the equipment pad.

SUMMARY OF THE INVENTION

Consequently, there is a need for a molded equipment pad that has sufficient strength to support heavy equipment while at the same time minimizing the amount of material used to construct the equipment pad. Minimizing the amount of material used in the construction of the equipment pad saves on cost, saves on weight, and minimizes the environmental impact of the manufacturing process of the equipment pad, the distribution of the equipment pad, and the ultimate disposal of the equipment pad.

The equipment pad of the present invention is molded of a thermoplastic, thermoset, or concrete material and is designed to support heavy equipment such as an air conditioner unit while minimizing the amount of material used in the construction of the equipment pad. The material used to mold the equipment pad of the present invention may be any conventional thermoplastic, thermoset, or concrete materials material used for molding equipment pads. A molded equipment pad in accordance with the present invention has a continuous equipment support deck, perimeter side walls, and an underlying network of arc-shaped reinforcing ribs.

In one embodiment of the present invention, the underlying network of reinforcing ribs includes both radial ribs and arc-shaped ribs. Particularly, the radial ribs are straight and radiate from the center point of the equipment pad. The arc-shaped ribs include a series of concentric arc-shaped ribs (centered on the center point of the equipment pad) and a number of distributed circular hubs. The concentric arc-shaped ribs radiate in concentric circles toward the side walls of the equipment pad, and the outermost concentric arc-shaped ribs intersect the side walls of the equipment pad. The concentric arc-shaped ribs may constitute a segment of a circle, a segment of an ellipse, or a segment of any other curved line, including smooth curved lines and curved lines with irregular curvature.

In a second embodiment of the invention, the molded equipment pad has radial ribs, arc-shaped ribs, and a number of distributed circular hubs. The arc-shaped ribs comprise a series of concentric arc-shaped ribs (centered on the center point of the equipment pad) and a series of opposing arc-shaped ribs (centered on the corners of the equipment pad). The concentric arc-shaped ribs radiate in concentric circles toward the side walls, but the outermost concentric arc-shaped ribs end short of the side walls of the equipment pad. The opposing arc-shaped ribs are centered on the corners of the equipment pad, radiate in concentric circles toward the center of the equipment pad, and intersect the side walls, the radial ribs, and the concentric arc-shaped ribs. The center arc-shaped ribs and the opposing arc-shaped ribs may constitute segments of a circle, segments of an ellipse, or segments of any other curved line, including smooth curved lines and curved lines with irregular curvature.

Where the radial ribs, the concentric arc-shaped ribs, and the opposing arc-shaped ribs intersect each other and intersect the side walls, the ribs may have gussets resulting from adding height to the rib at the intersection. Moreover, where the ribs intersect each other, the intersection may be in the form of a post-shaped fillet to increase the strength of the intersection. Such gusseted and filleted intersections allow the height of the ribs between the gusseted and filleted intersections to be reduced with the attendant reduction of material.

When the pad is loaded as intended, a force is exerted perpendicular to the top deck. The concentric arc-shaped ribs and the opposing arc-shaped ribs react to the perpendicular force by "flattening" and supporting the top deck more evenly than conventional straight-line ribs. The nature of the arc shape allows the ribs to react to the applied forces in a compound manner on multiple planes of support. The "flattening" of the network of arc-shaped ribs is counteracted by the straight-line radial ribs. The radial ribs also tie the network of arc-shaped ribs together, which furthers the arc-shaped ribs' ability to counteract downward forces on the top deck.

In the second embodiment of the invention, the outer opposing arc-shaped ribs of the molded equipment pad reinforce the outermost concentric arc-shaped ribs in a fashion similar to the reinforcement provided by the straight radial ribs. The design of the opposing arc-shaped ribs also provides a more frequent support interval to the substantially perpendicular perimeter side walls than if the pattern of concentric arc-shaped ribs were propagated all the way to the side walls of the equipment pad as configured in the first embodiment of the invention. The outer opposing arc-shaped ribs are also gusseted where they meet the equipment pad side walls to reinforce the side walls of the pad.

In both the first and second embodiments, distributed circular hubs are located in each of the quadrants of the equipment pad. The radial ribs extend through the circular hubs, and the circular hubs have straight hub cross ribs positioned within the distributed circular hubs. The straight hub cross ribs and the portions of the radial ribs within the circular hubs support the top deck at the centers of the circular hubs. The straight hub cross ribs and the portions of the radial ribs within the circular hubs are gusseted where the straight hub cross ribs and the radial ribs intersect the inside of the circular hubs.

The height of the concentric arch-shaped ribs and of the opposing arc-shaped ribs varies according to the length of the arc-shaped ribs with longer ribs being taller to compensate for the increase in forces applied over the length. By varying rib heights, the amount of material for the ribs can be optimized. With the ribs optimized, the top deck can be substantially thinner because the deck strength is not dictated solely by the thickness of the deck. Particularly, the equipment pad in accordance with the present invention has a number of short ribs to compensate for the lost stiffness by thinning the top deck. The equipment pad in accordance with the present invention has a top deck that is twice as stiff (measured by maximum deflection at a fixed load) as conventional pad with a deck that is more than twice as thick. The invention thus results in an equipment pad that is lighter with increased structural strength by using less polymer material.

In a third embodiment of the present invention, the molded equipment pad has corner originating arc-shaped ribs each of which is the arc of a circle having its center point located midway between the corners of the equipment pad and outside the side walls of the equipment pad.

In a fourth embodiment of the present invention, the molded equipment pad has a series of arc-shaped ribs each in the form of a sine wave extending across either the length or the width of the equipment pad or extending across both the length and the width of the equipment pad.

In a fifth embodiment of the present invention, the molded equipment pad has a series of concentric arc-shaped ribs (centered on the pad center point). Each of the concentric arc-shaped ribs has an irregular shaped curvature made up of short segments to create an undulating curvature for the concentric arc-shaped ribs.

In a sixth embodiment of the present invention, the molded equipment pad has a series of concentric arc-shaped ribs (centered on the pad center point). Each of the concentric arc-shaped ribs has an irregular shaped curvature made up of short segments connected at obtuse angles to each other to create a segmented curvature for the concentric arc-shaped ribs.

In a seventh embodiment of the present invention, the molded equipment pad has two (or more) sections with a center point for each section. The molded equipment pad has concentric arc-shaped ribs centered on the center points of the equipment pad, corner opposing arc-shaped ribs centered on the corners of the equipment pad, and side opposing arc-shaped ribs centered on center points along the sides and positioned between the corners of the equipment pad. The concentric arc-shaped ribs radiate outwardly from the center points and may or may not intersect the side walls of the equipment pad. The corner opposing arc-shaped ribs may or may not intersect the concentric arcs-shaped ribs, and the side opposing arc-shaped ribs may or may not intersect the concentric arc-shaped ribs. The center arc-shaped ribs, the corner opposing arc-shaped ribs, and the side opposing arc-shaped ribs may constitute segments of a circle, segments of an ellipse, or segments of any other curved line, including smooth curved lines and curved lines with irregular curvature. The seventh embodiment of the present invention may also have radial ribs radiating from each of the center points.

Further objects, features and advantages will become apparent upon consideration of the following detailed description of the invention when taken in conjunction with the drawings and the appended claims.

BRIEF DESCRIPTION OF THE DRAWINGS

FIG. 13A is a bottom perspective view of the equipment pad in accordance with the second embodiment of the present invention.

FIG. 13B is an enlarged bottom perspective view of the equipment pad (circled in FIG. 13A) in accordance with the second embodiment of the present invention.

DETAILED DESCRIPTION OF THE PREFERRED EMBODIMENT

FIGS. 1-7 illustrate a first embodiment of a molded equipment pad with, reinforcing radial ribs, reinforcing concentric arc-shaped ribs, and distributed hubs.

FIGS. 8-14 illustrate a second embodiment of a molded equipment pad with, reinforcing radial ribs, reinforcing concentric arc-shaped ribs, reinforcing opposing arc-shaped ribs, and distributed hubs.

Figure 15:
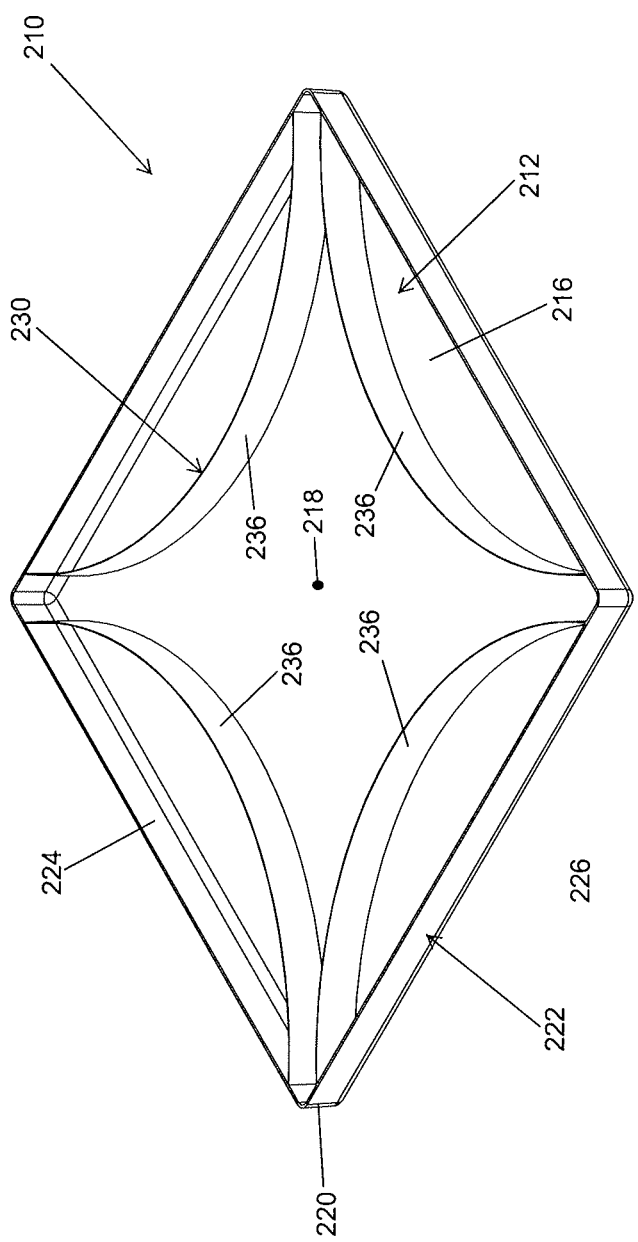
FIG. 15 is a bottom perspective view of an equipment pad in accordance with a third embodiment of the present invention.
Figure 16:
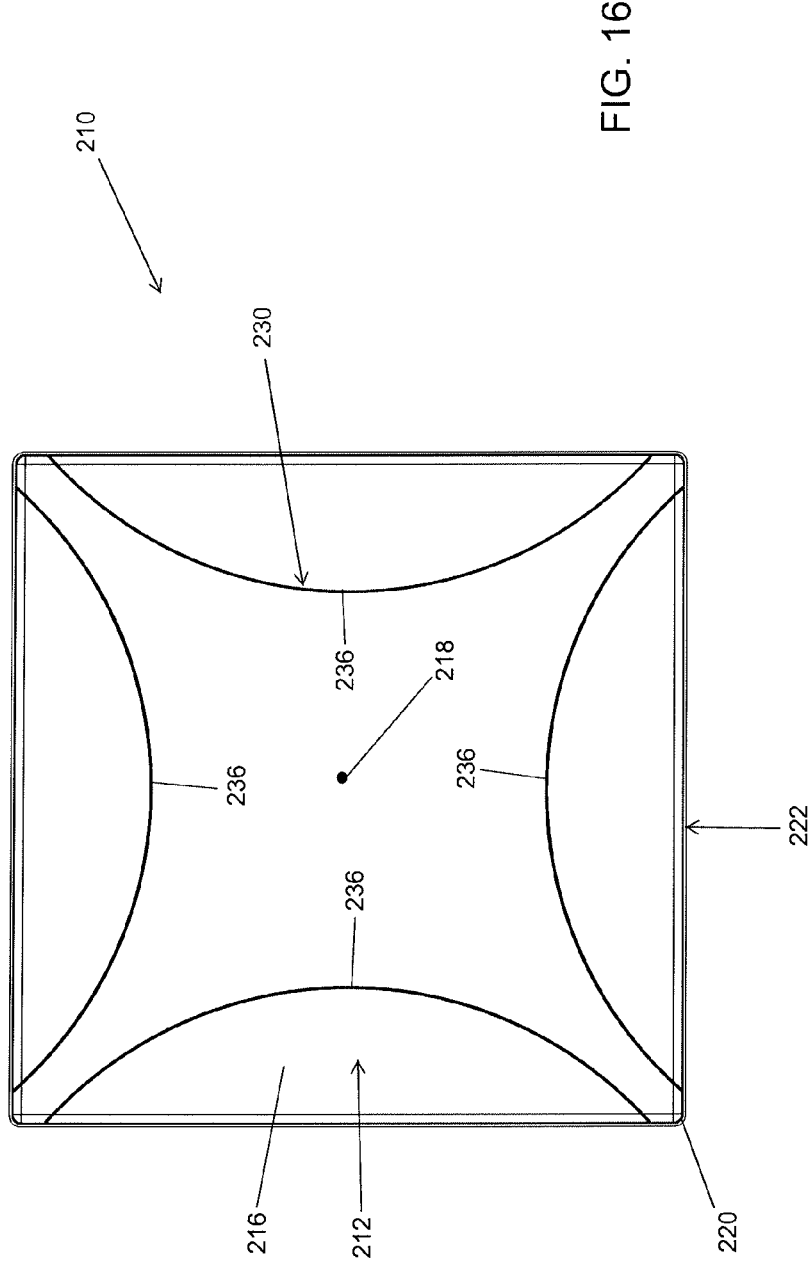
FIG. 16 is a bottom plan view of the equipment pad in accordance with the third embodiment of the present invention.

FIGS. 15-16 illustrate a third embodiment of a molded equipment pad with reinforcing corner originating arc-shaped ribs.

Figure 17:
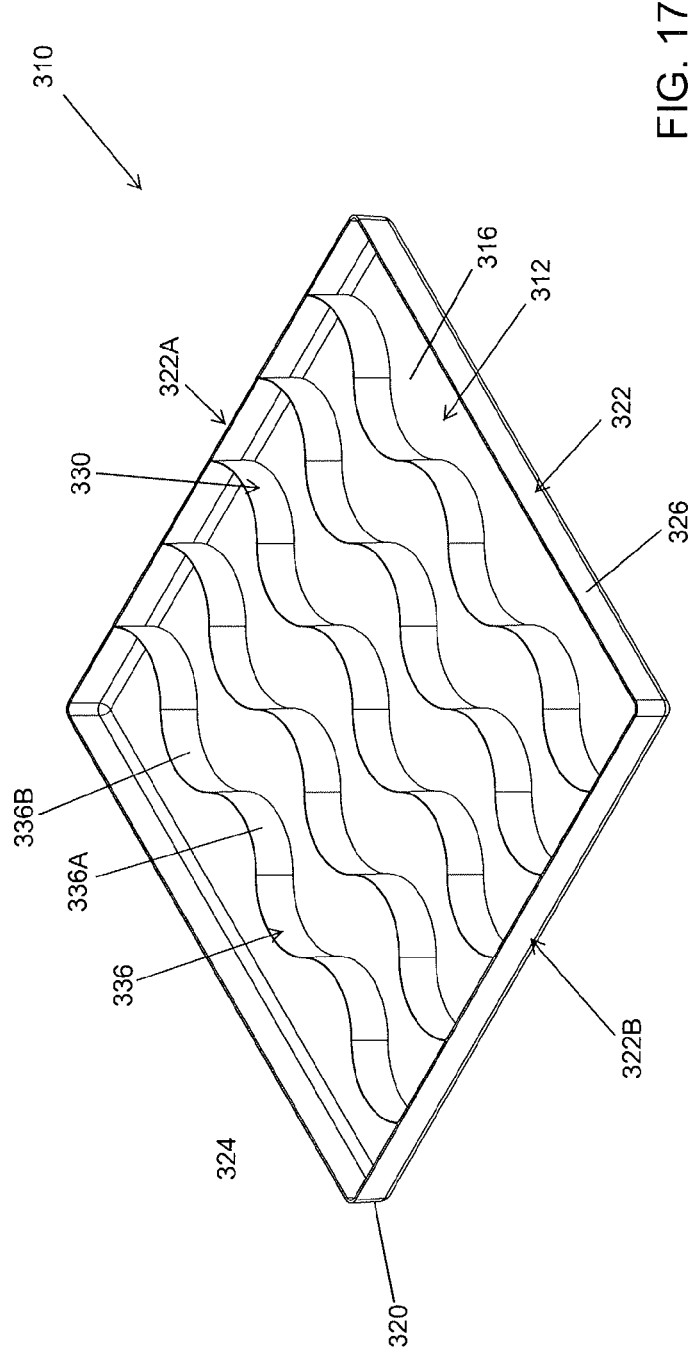
FIG. 17 is a bottom perspective view of an equipment pad in accordance with a fourth embodiment of the present invention.
Figure 18:
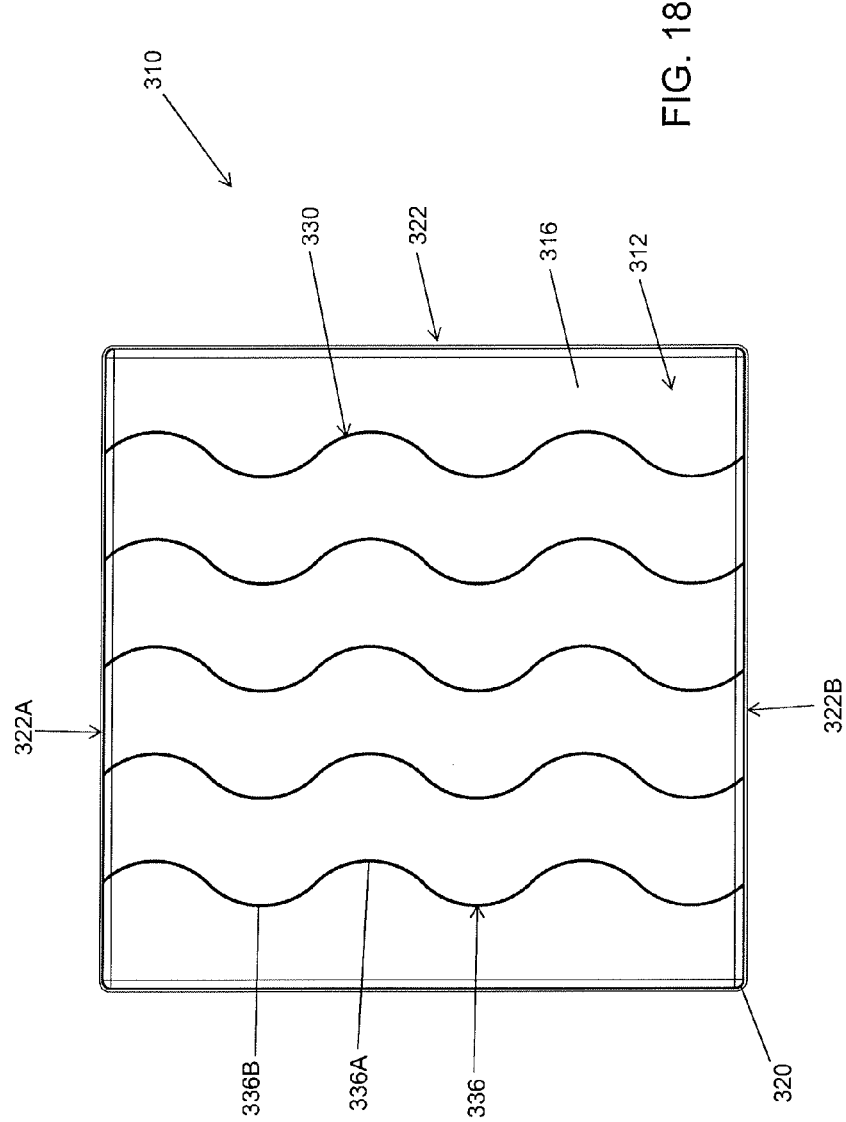
FIG. 18 is a bottom plan view of the equipment pad in accordance with the fourth embodiment of the present invention.

FIGS. 17-18 illustrate a fourth embodiment of a molded equipment pad with reinforcing sine wave arc-shaped ribs.

Figure 19:
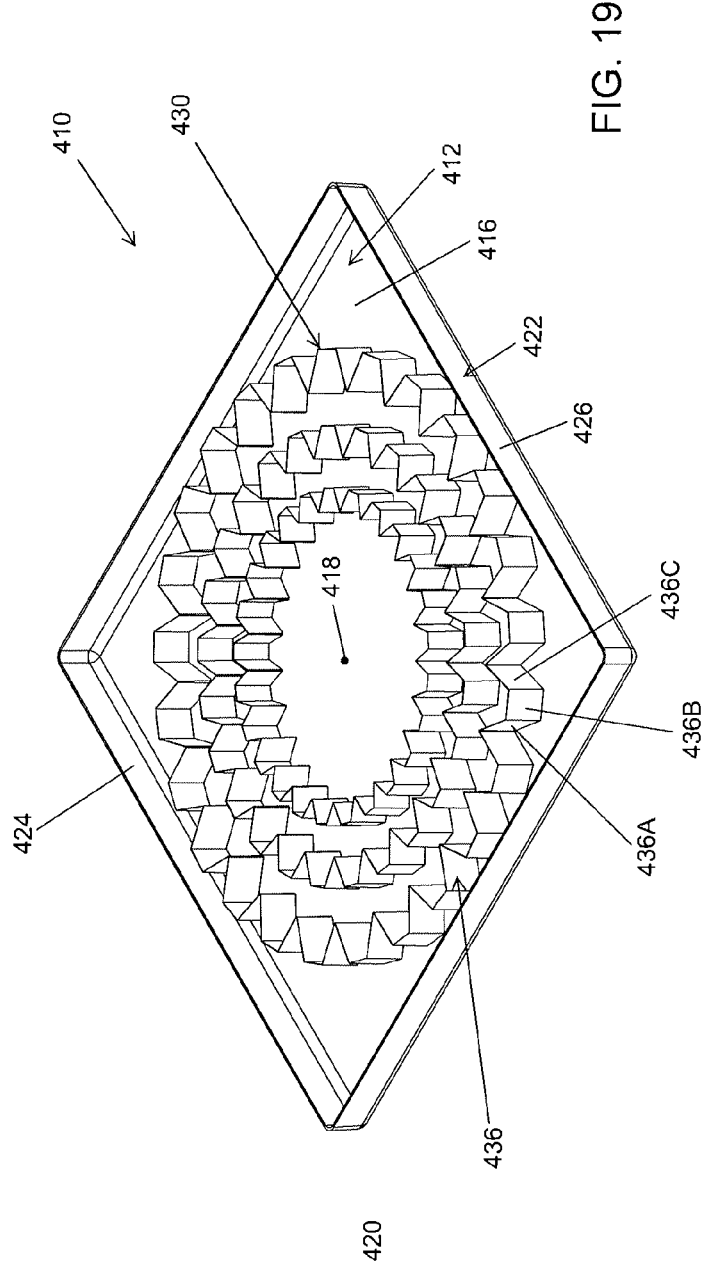
FIG. 19 is a bottom perspective view of an equipment pad in accordance with a fifth embodiment of the present invention.
Figure 20:
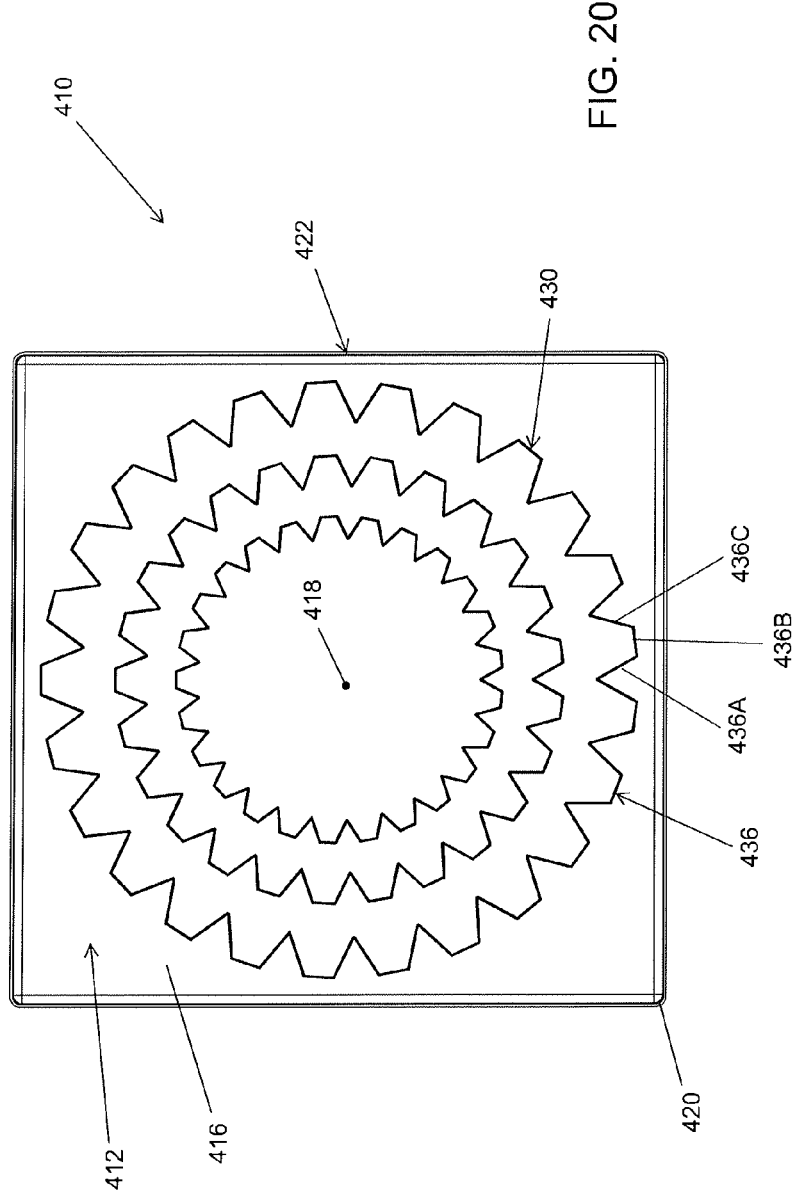
FIG. 20 is a bottom plan view of the equipment pad in accordance with the fifth embodiment of the present invention.

FIGS. 19-20 illustrate a fifth embodiment of a molded equipment pad with reinforcing concentric arc-shaped ribs with irregular undulating curvature.

Figure 21:
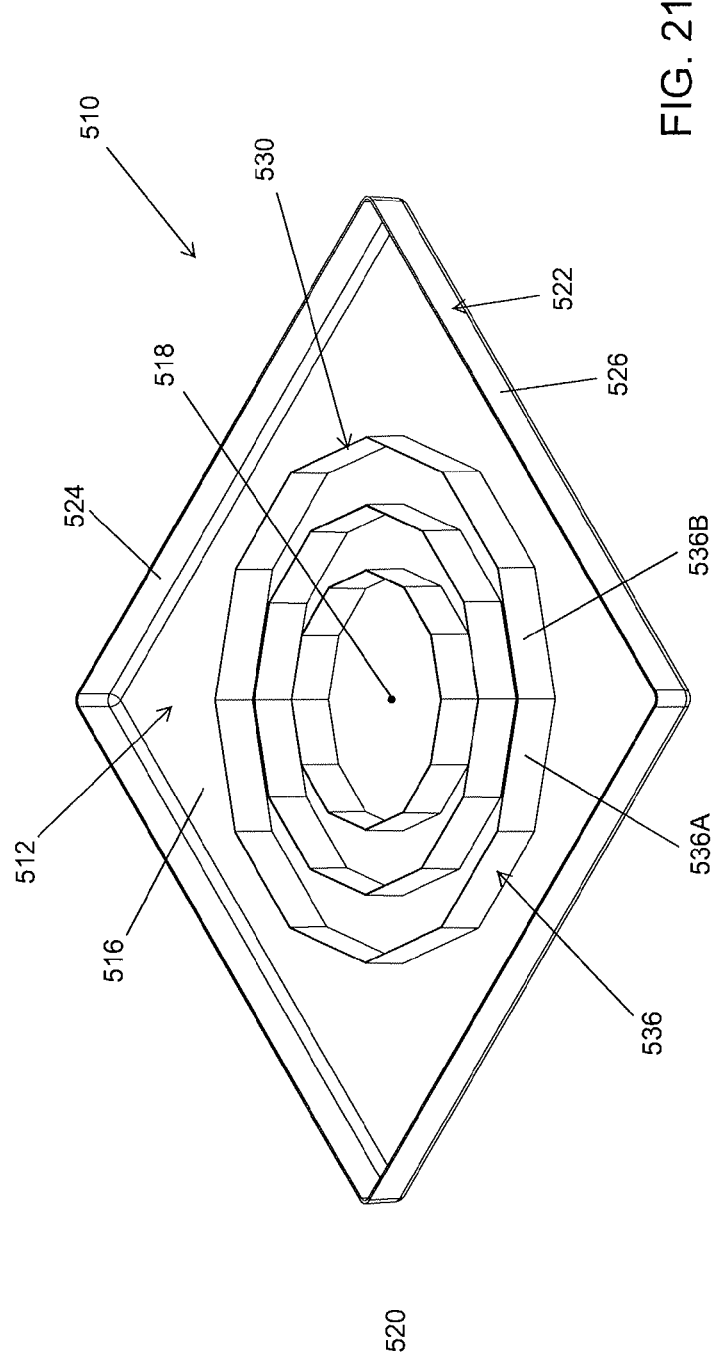
FIG. 21 is a bottom perspective view of an equipment pad in accordance with a sixth embodiment of the present invention.
Figure 22:
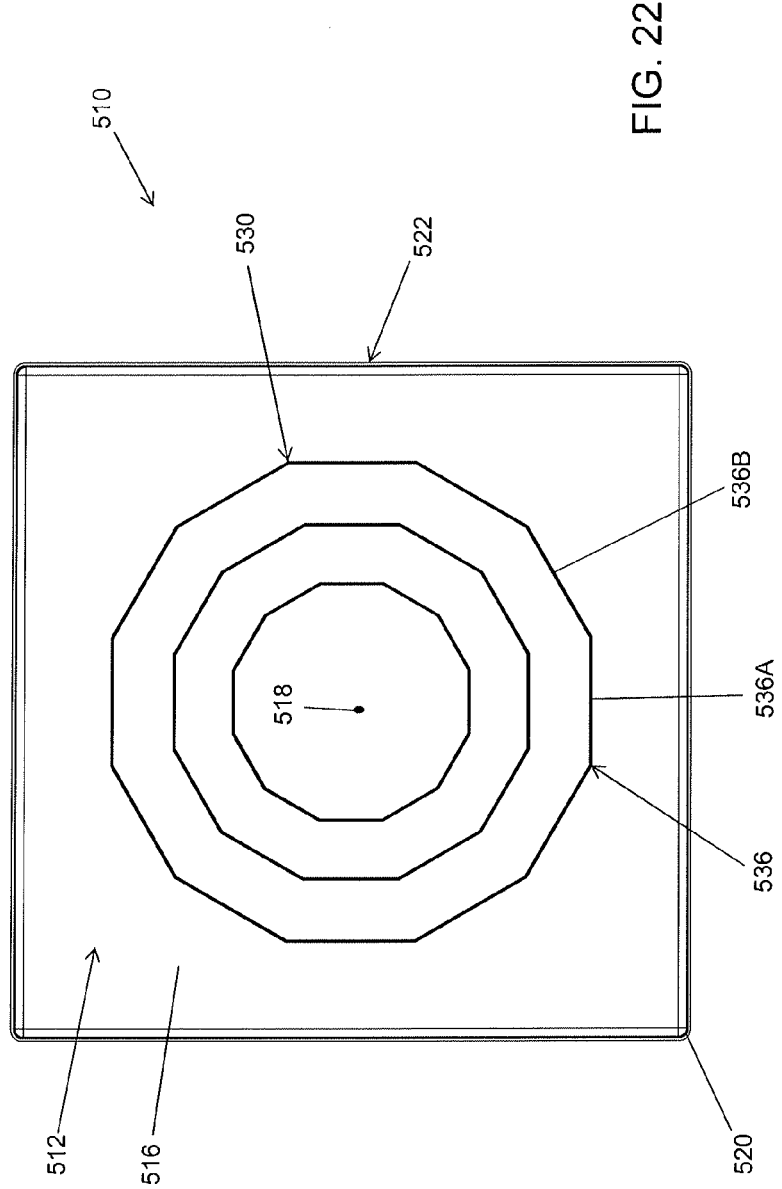
FIG. 22 is a bottom plan view of the equipment pad in accordance with the sixth embodiment of the present invention.

FIGS. 21-22 illustrate a sixth embodiment of a molded equipment pad with reinforcing concentric arc-shaped ribs with irregular segmented curvature.

Figure 23:
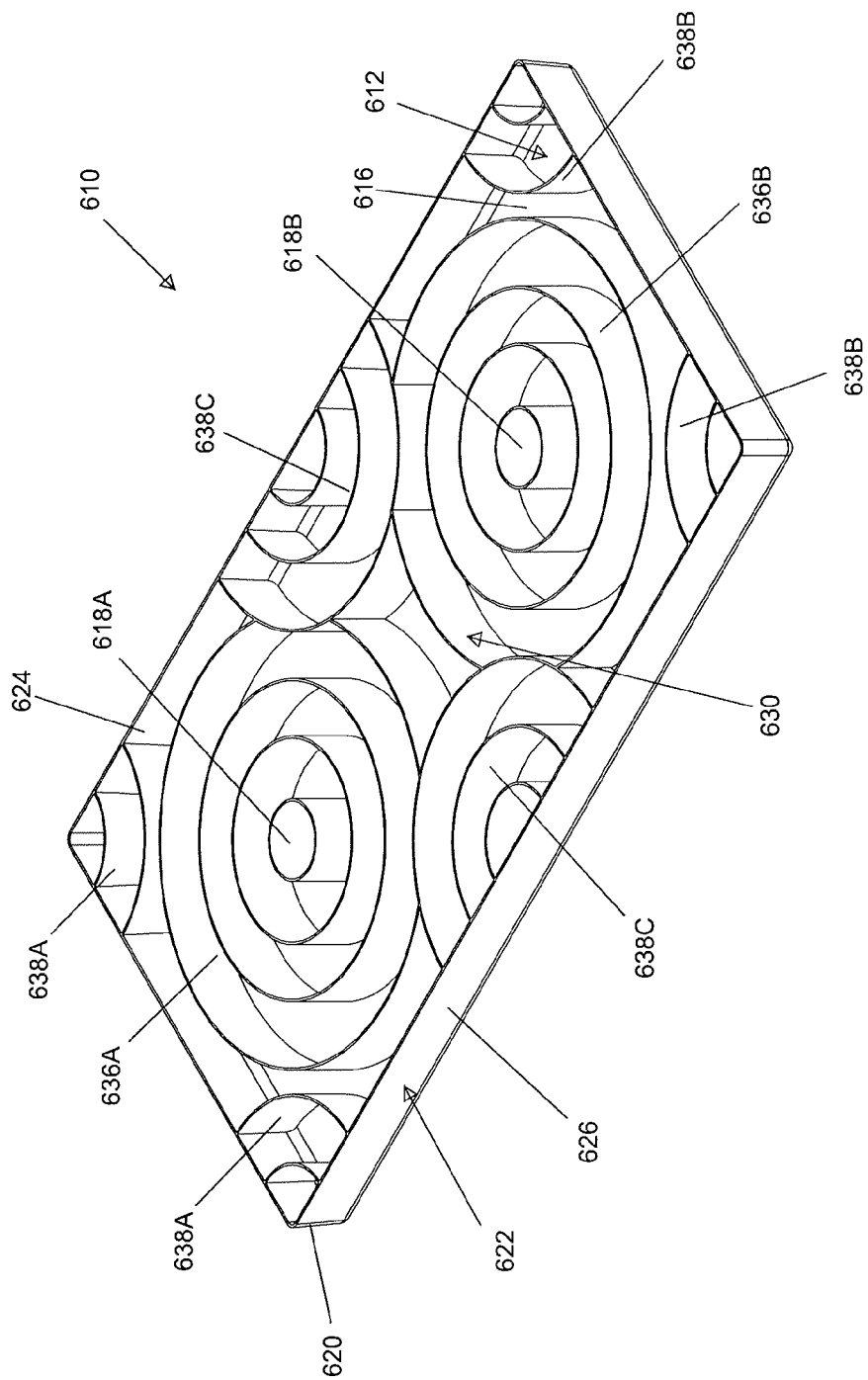
FIG. 23 is a bottom perspective view of an equipment pad in accordance with a seventh embodiment of the present invention.
Figure 24:
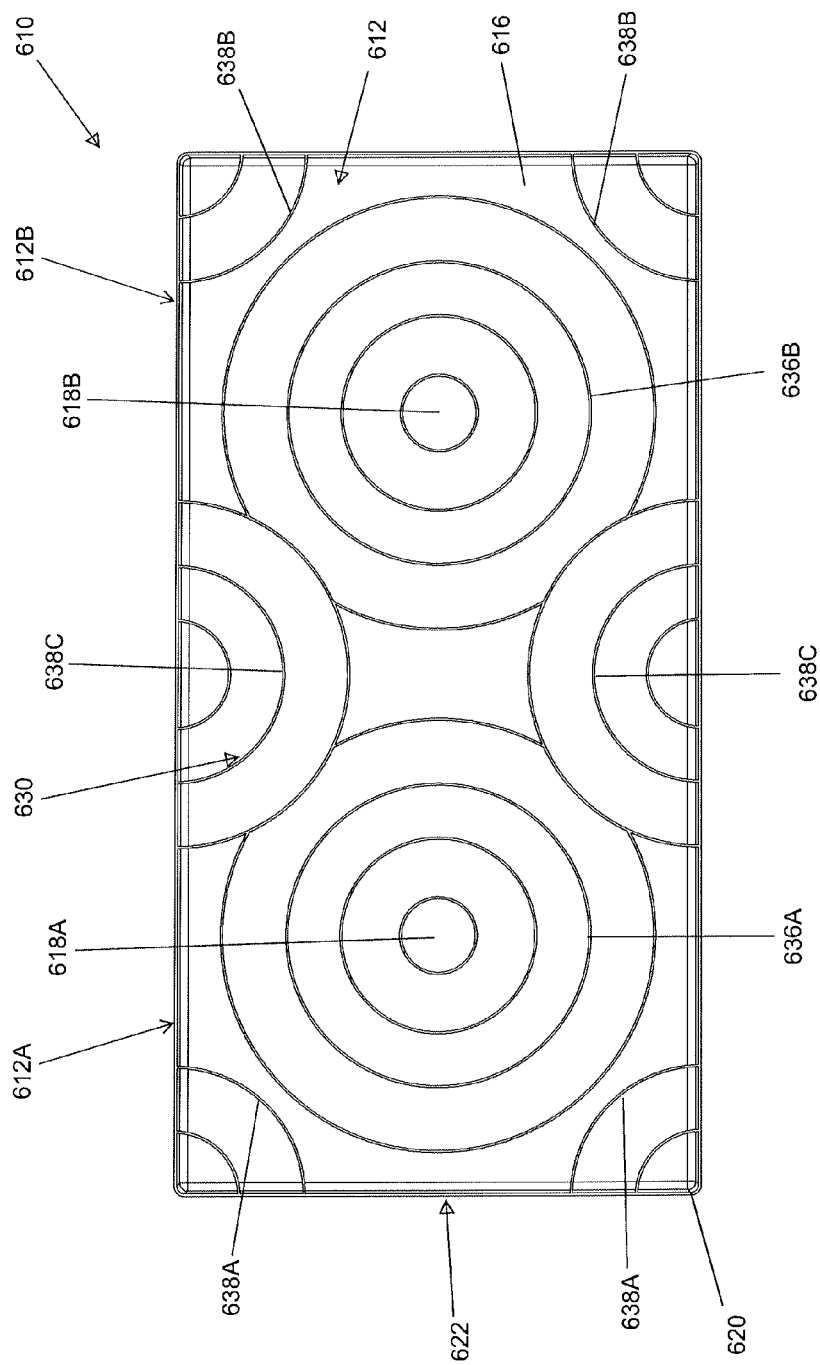
FIG. 24 is a bottom plan view of the equipment pad in accordance with the seventh embodiment of the present invention.

FIGS. 23-24 illustrate a seventh embodiment of a molded equipment pad two sections, each section with reinforcing concentric arc-shaped ribs, side opposing arc-shaped ribs and corner opposing arc-shaped ribs.

Turning to FIGS. 1-5, a molded equipment pad 10 comprises an equipment support deck 12 having a deck top surface 14 and a deck bottom surface 16, side walls 22 having internal surfaces 24 and external services 26, and an underlying network 30 of reinforcing ribs attached to the bottom surface 16 of the deck 12. The material used to mold the equipment pad 10 of the present invention may include virtually any moldable material. Suitable materials may include without limitation, thermoplastics (including polyethylene, polypropylene, ABS, styrene, and nylon), thermosets, and concrete (including polymer concrete, self consolidating concrete, and conventional concrete).

The equipment support deck 12 is generally rectangular with a center point 18 generally equidistant from the side walls 22. The equipment support deck 12 may also be other geometric shapes including but not limited to square, triangular, hexagonal, octagonal, circular, or elliptical. The top surface 14 of the deck 12 is generally planar. The four side walls 22 are attached to the edges of the deck 12 and extend downwardly. The four side walls 22 are joined at their edges to form corners 20 of the pad 10.

Figure 1:
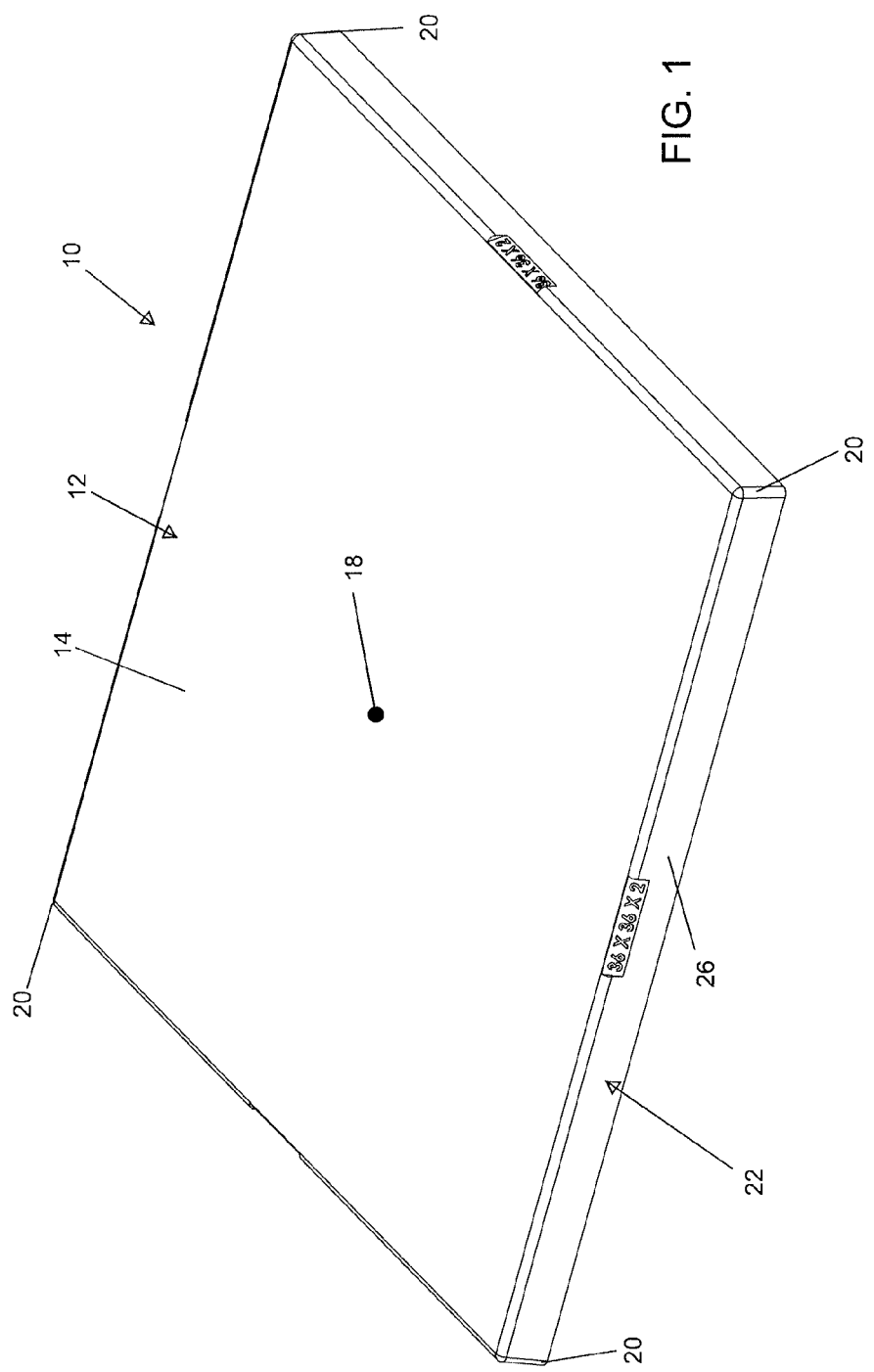
FIG. 1 is a top perspective view of an equipment pad in accordance with a first embodiment of the present invention.
Figure 2:
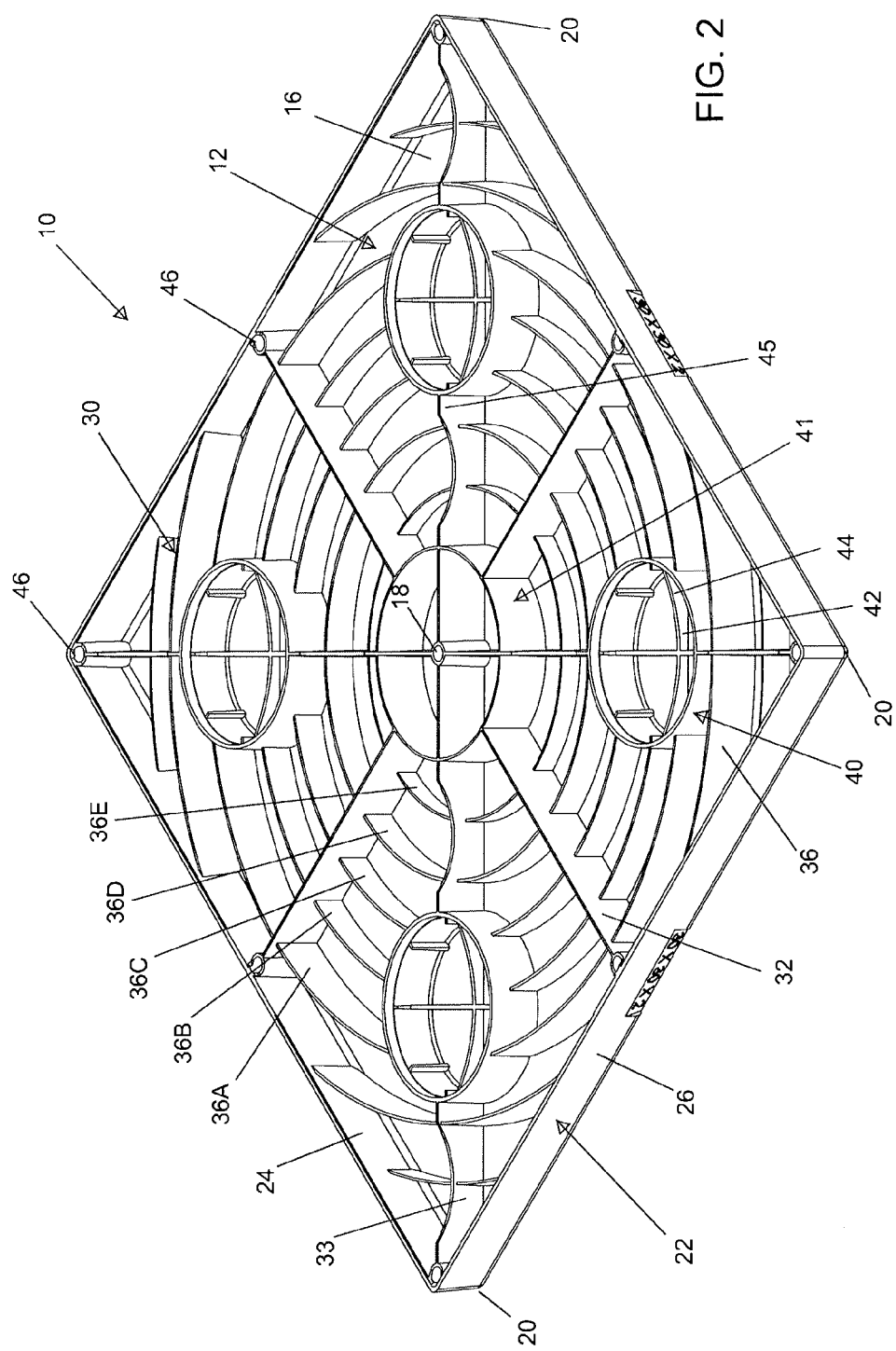
FIG. 2 is a bottom perspective view of the equipment pad in accordance with the first embodiment of the present invention.
Figure 3:
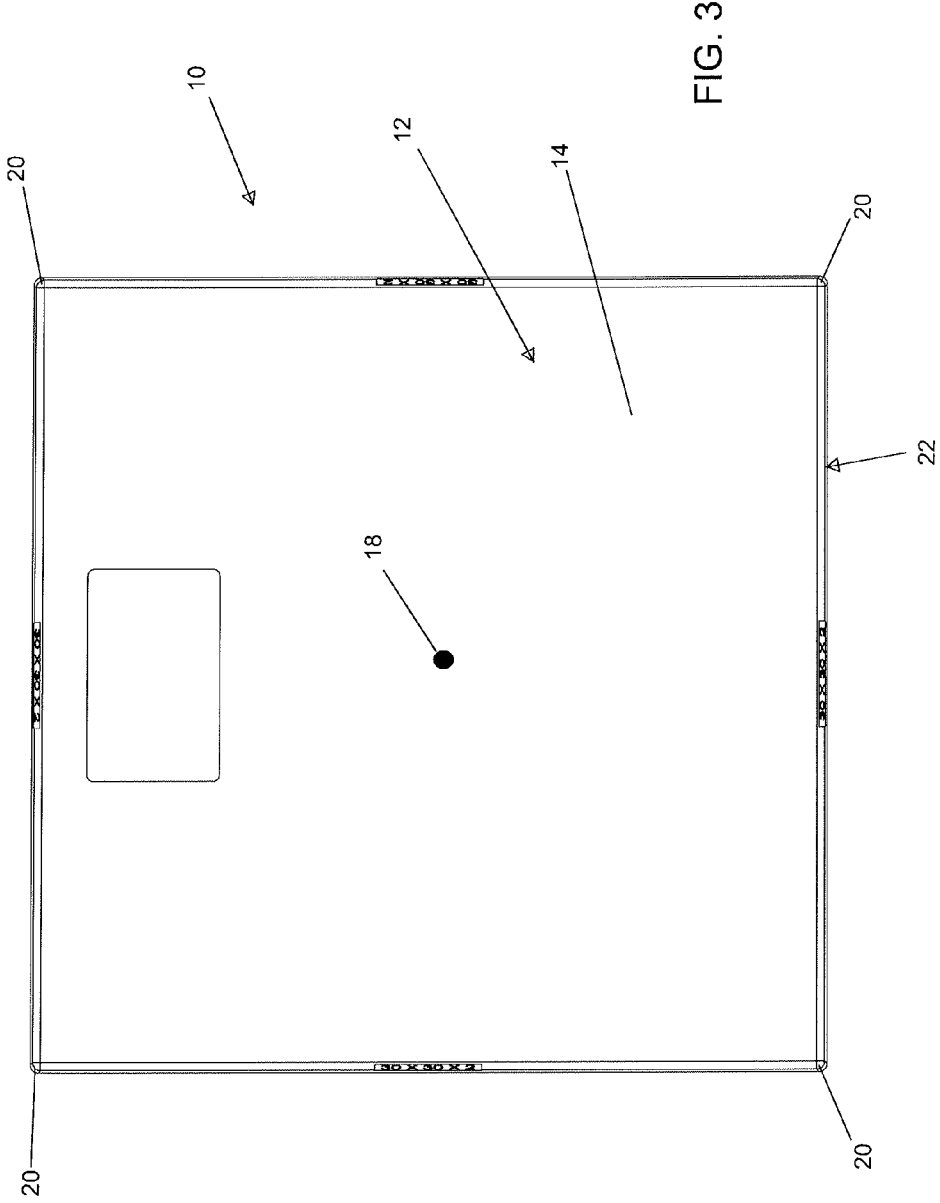
FIG. 3 is a top plan view of the equipment pad in accordance with the first embodiment of the present invention.
Figure 4:
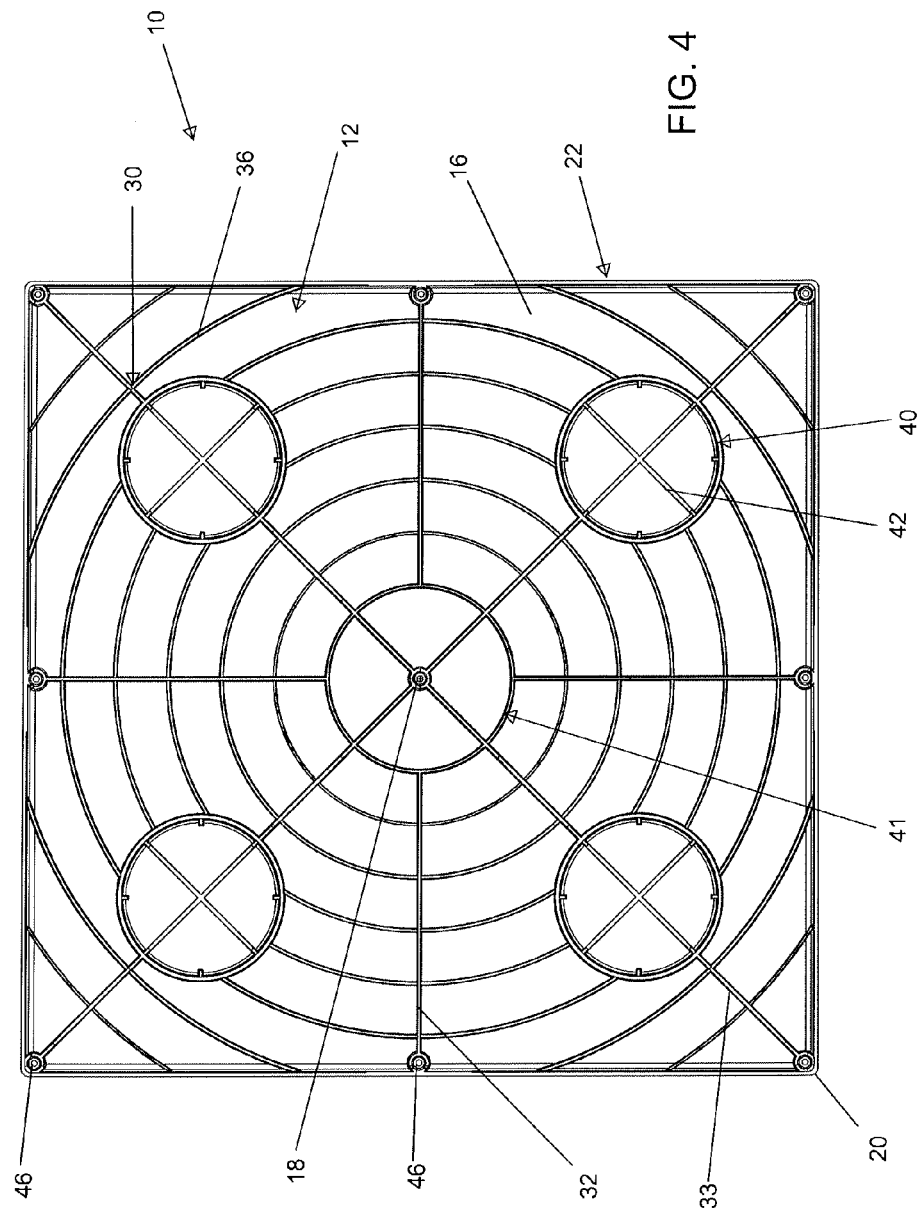
FIG. 4 is a bottom plan view of the equipment pad in accordance with the first embodiment of the present invention.
Figure 5:
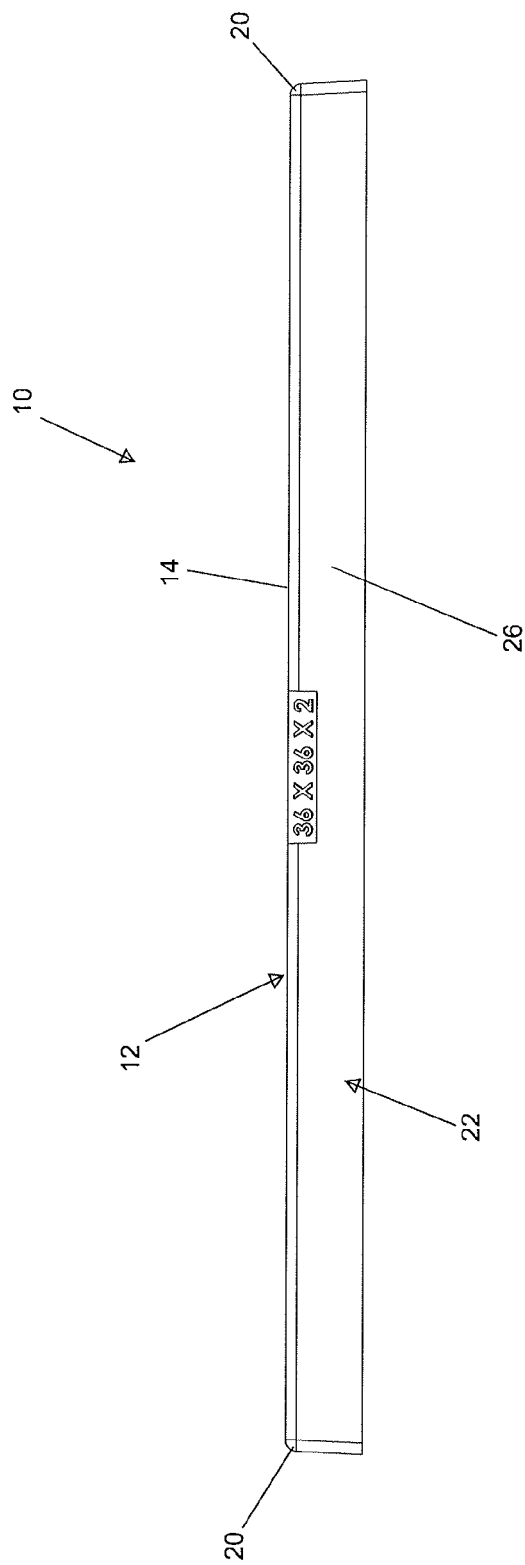
FIG. 5 is a side elevation view of the equipment pad in accordance with the first embodiment of the present invention.

As shown in FIGS. 2 and 4, a network 30 of reinforcing ribs is attached to the bottom surface 16 of the deck 12 and occupies the space between the side walls 22. The network 30 of reinforcing ribs includes segments of straight radial ribs 32 that extend from the side walls 22 toward the center point 18 and segments of straight radial ribs 33 that extend from the corners 20 toward the center point 18. Post-shaped fillets 46 are used at the intersections of the straight radial ribs 32 and the internal surface 24 of the side walls 22 to reinforce the intersection. The post shaped fillets 46 also have openings to accept anti-vibration rubber bumpers (not shown). Likewise, post-shaped fillets 46 are used at the intersections of the straight radial ribs 33 and the corners 20 to reinforce the intersections. The network 30 of reinforcing ribs further includes segments of a series of concentric arc-shaped ribs 36 that are centered on the center point 18. The concentric arc-shaped ribs 36 intersect the straight radial ribs 32 and 33, and the outermost segments of the arc-shaped ribs 36 intersect the internal surface 24 on the side walls 22. As the concentric arc-shaped ribs 36 are positioned further from the center point 18, the height of the concentric arc-shaped ribs 36 increases to provide greater strength in the longer segments of the concentric arc-shaped ribs 36 between the straight radial ribs 32 and 33. For example, the outermost segment 36A of the concentric arc-shaped ribs 36 has a greater height than the innermost segment 36E with the segments 36A-36E gradually decreasing in height as the segments become shorter between the straight radial ribs 32 and 33.

With continuing reference to FIGS. 2 and 4, the network 30 of reinforcing ribs further includes distributed circular hubs 40 and a center hub 41. In the embodiment shown in FIGS. 2 and 4, the center circular hub 41 is centered on the center point 18 of the network 30 of reinforcing ribs, and the four distributed hubs 40 are each located in the four quadrants of the network 30 of reinforcing ribs. With reference to FIG. 2, the straight radial ribs 33 extended through and intersect the distributed hubs 40, and therefore reinforce the walls of the distributed hubs 40. Inside the distributed hubs 40 the straight radial ribs 33 are of reduced height because the reinforcement of the deck 12 by the distributed hubs 40 reduces the reinforcement requirements of the straight radial ribs 33 inside the distributed hubs 40. In addition, hub cross ribs 42 are positioned at essentially right angles to the segments of the radial ribs 33 inside the distributed hubs 40. The hub cross ribs 42 lend additional support to the deck 12 inside the distributed hubs 40. The hub cross ribs 42 are of reduced height because of the support provided by the distributed hubs 40 themselves. The hub cross ribs 42 and the segments of the straight radial ribs 33 inside the distributed hubs 40 have increased height or gussets 44 where the hub cross ribs 42 and the segments of the straight radial ribs 33 intersect the distributed hubs 40 to add additional strength to the intersection points. Similarly, the portions of the radial ribs 33 outside of the distributed hubs 40 have increased height or gussets 45 where the radial ribs 33 intersect the outside of the distributed hubs 40 to increase the strength of the intersection. The segments of the radial ribs 33 inside the center circular hub 41 are the same height as the walls of the center circular hub 41. The segments of the radial ribs 33 outside the center circular hub 41 are of reduced height with a gusset where the segments of the radial ribs 33 intersect the outside wall of the center circular hub 41.

Figure 6:
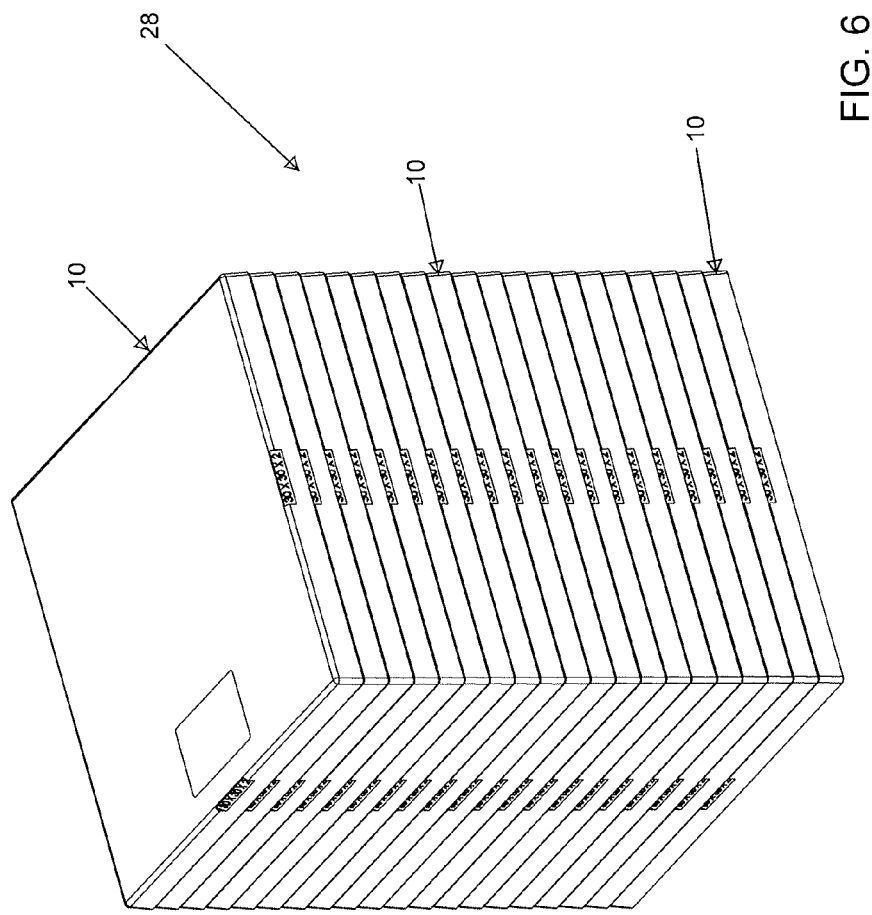
FIG. 6 is a top perspective view of a stack of equipment pads, stacked for shipping and storage, in accordance with a first embodiment of the present invention.
Figure 7:
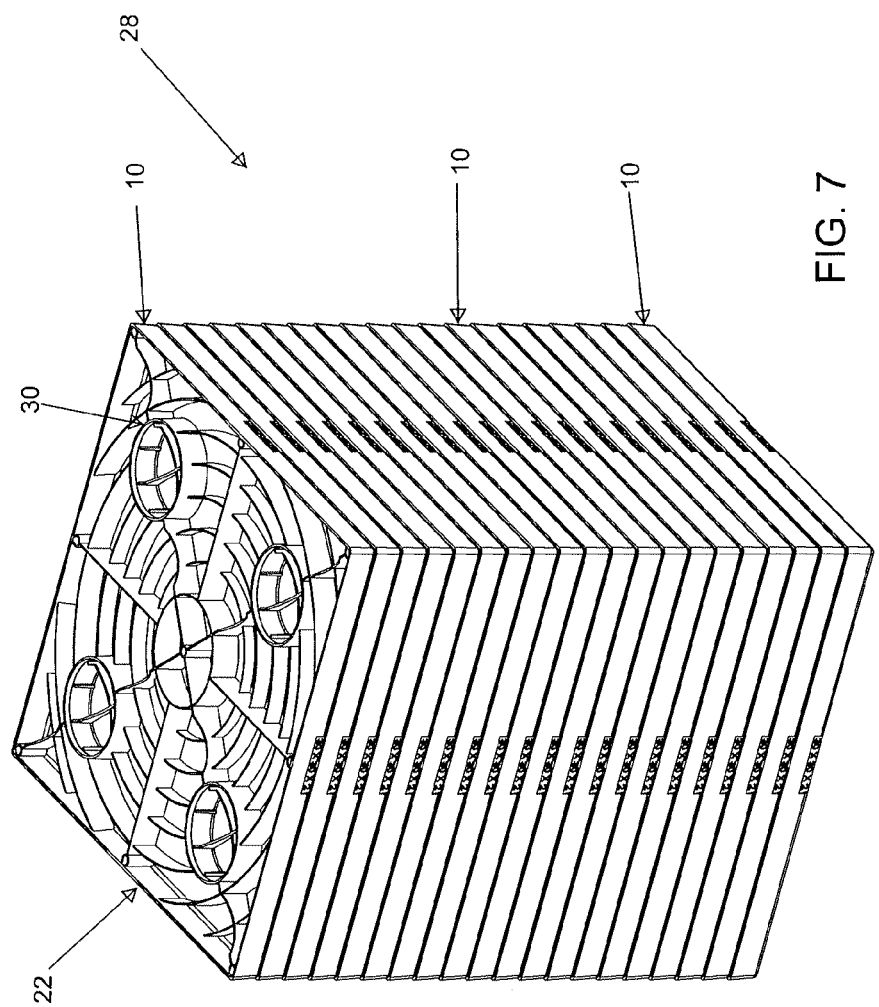
FIG. 7 is a bottom perspective view of the stack of equipment pads, stacked for shipping and storage, in accordance with the first embodiment of the present invention.
Figure 8:
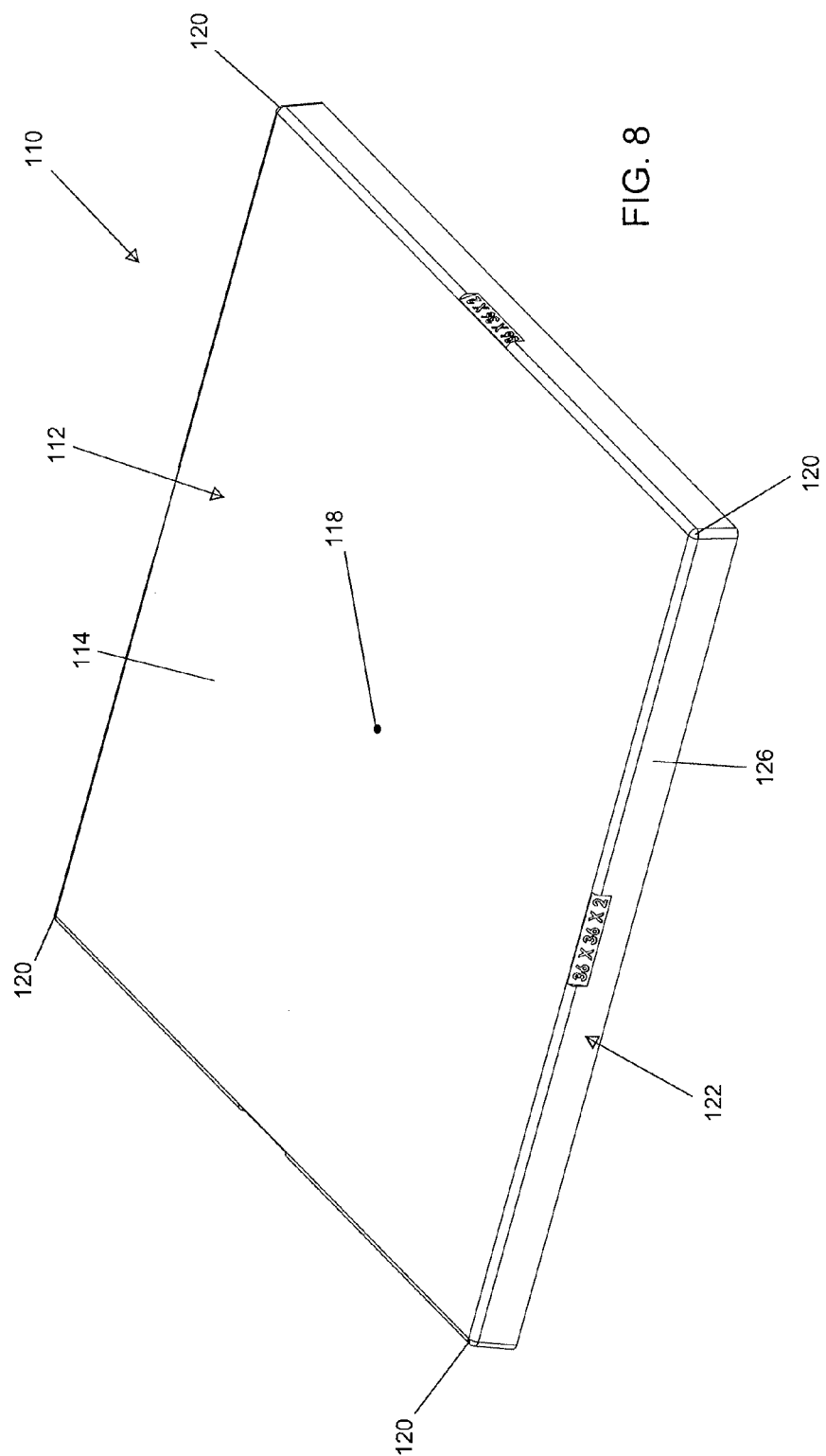
FIG. 8 is a top perspective view of an equipment pad in accordance with a second embodiment of the present invention.
Figure 9:
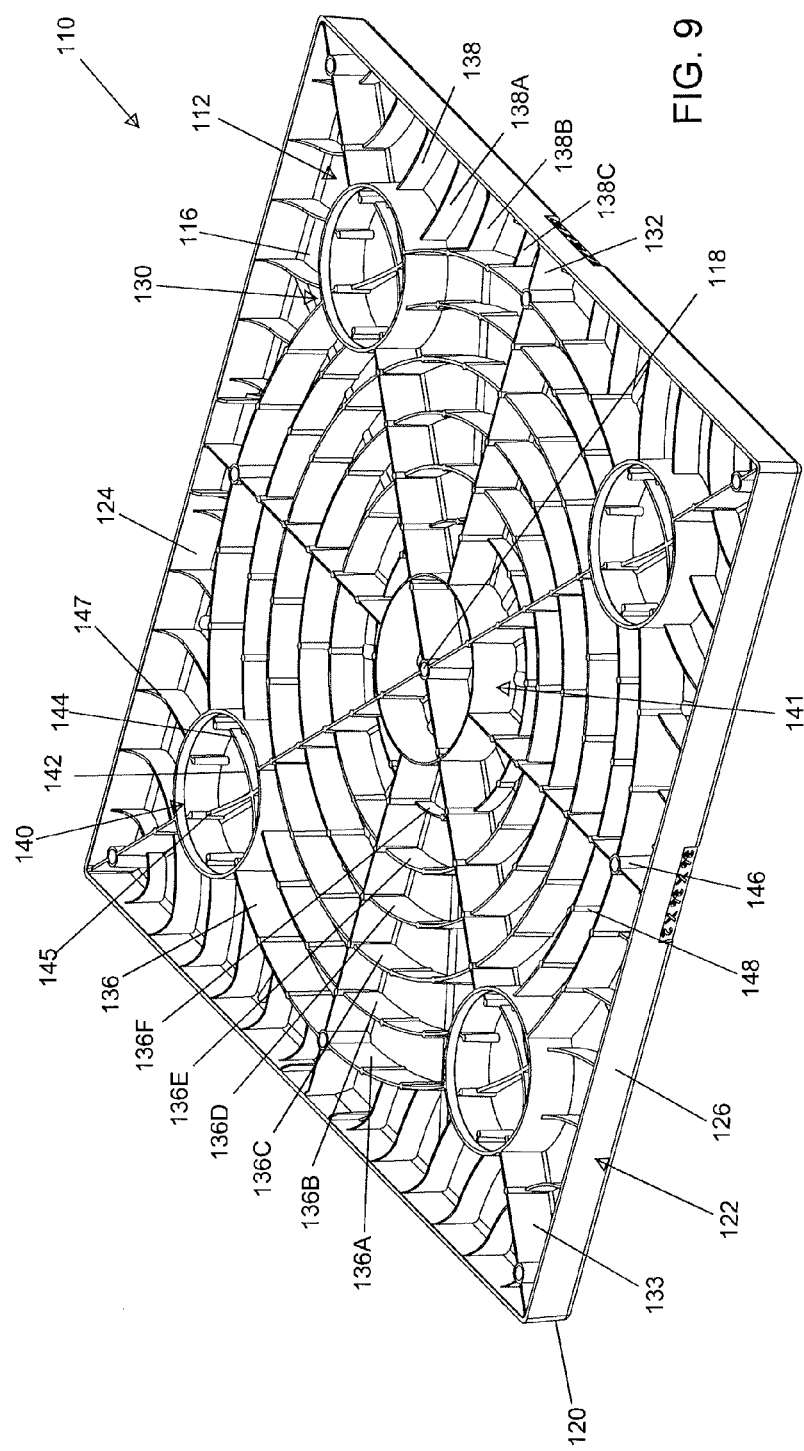
FIG. 9 is a bottom perspective view of the equipment pad in accordance with the second embodiment of the present invention.
Figure 10:
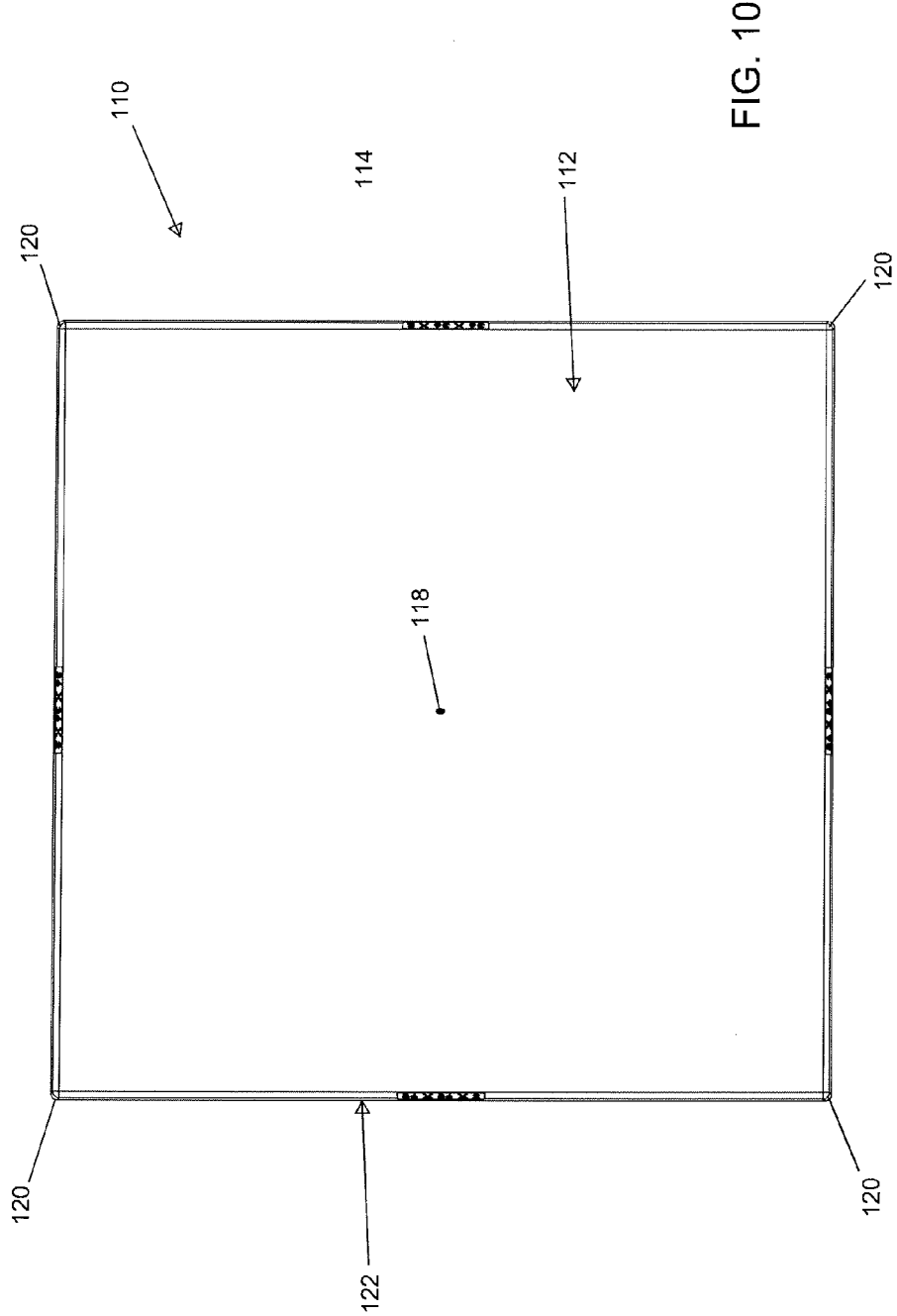
FIG. 10 is a top plan view of the equipment pad in accordance with the second embodiment of the present invention.
Figure 11:
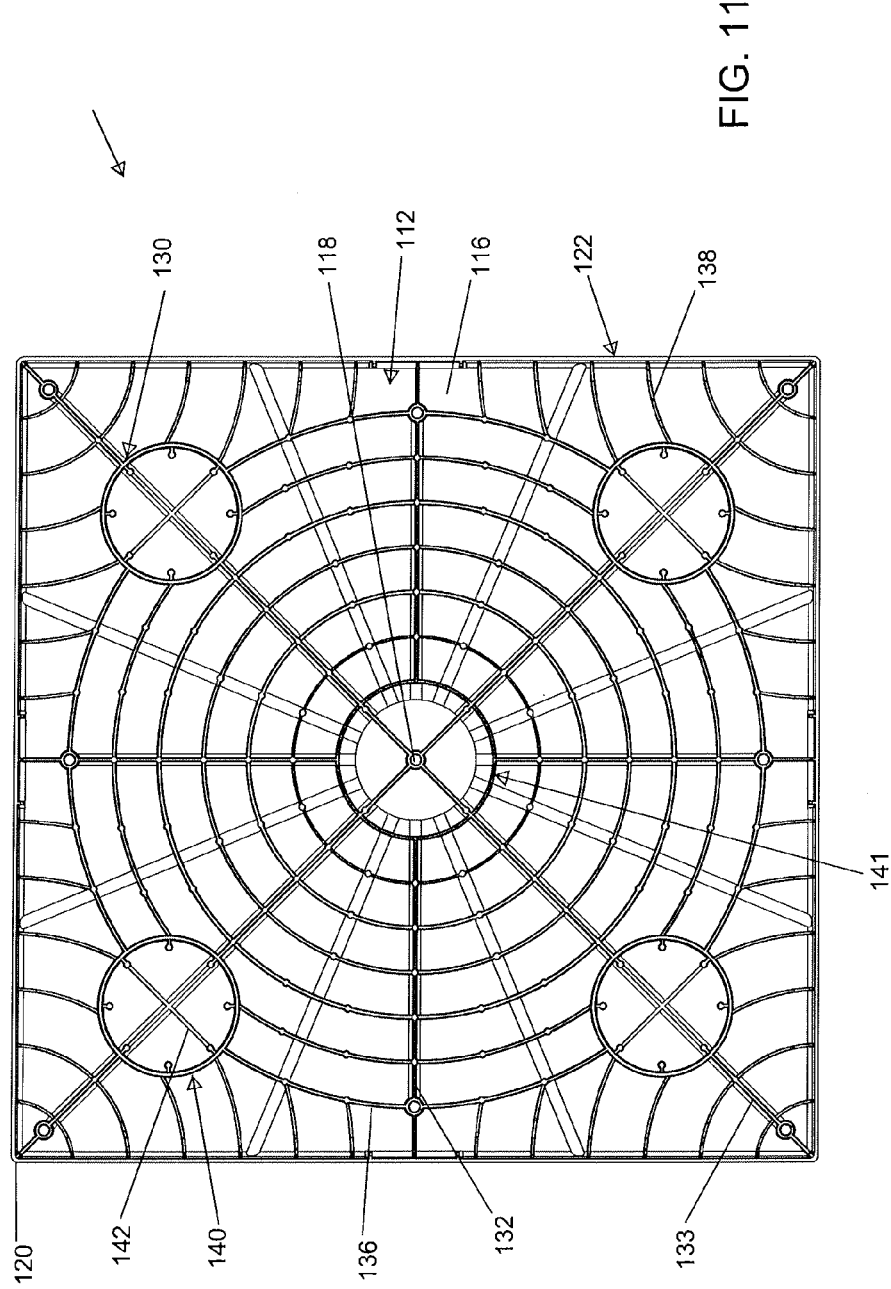
FIG. 11 is a bottom plan view of the equipment pad in accordance with the second embodiment of the present invention.
Figure 12:
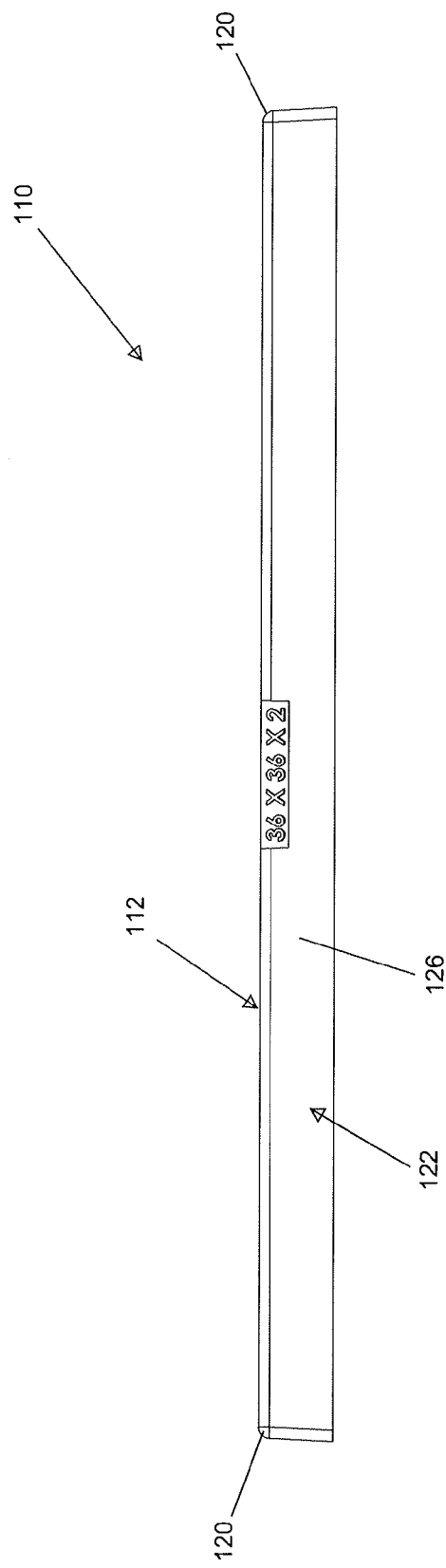
FIG. 12 is a side elevation view of the equipment pad in accordance with the second embodiment of the present invention.
Figure 14A:
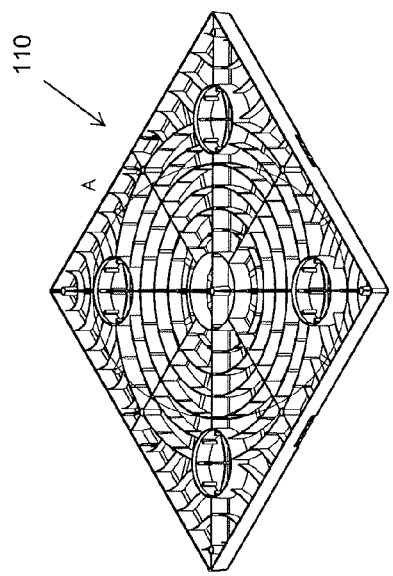
FIG. 14A is a bottom perspective view of the equipment pad in accordance with the second embodiment of the present invention.
Figure 14B:
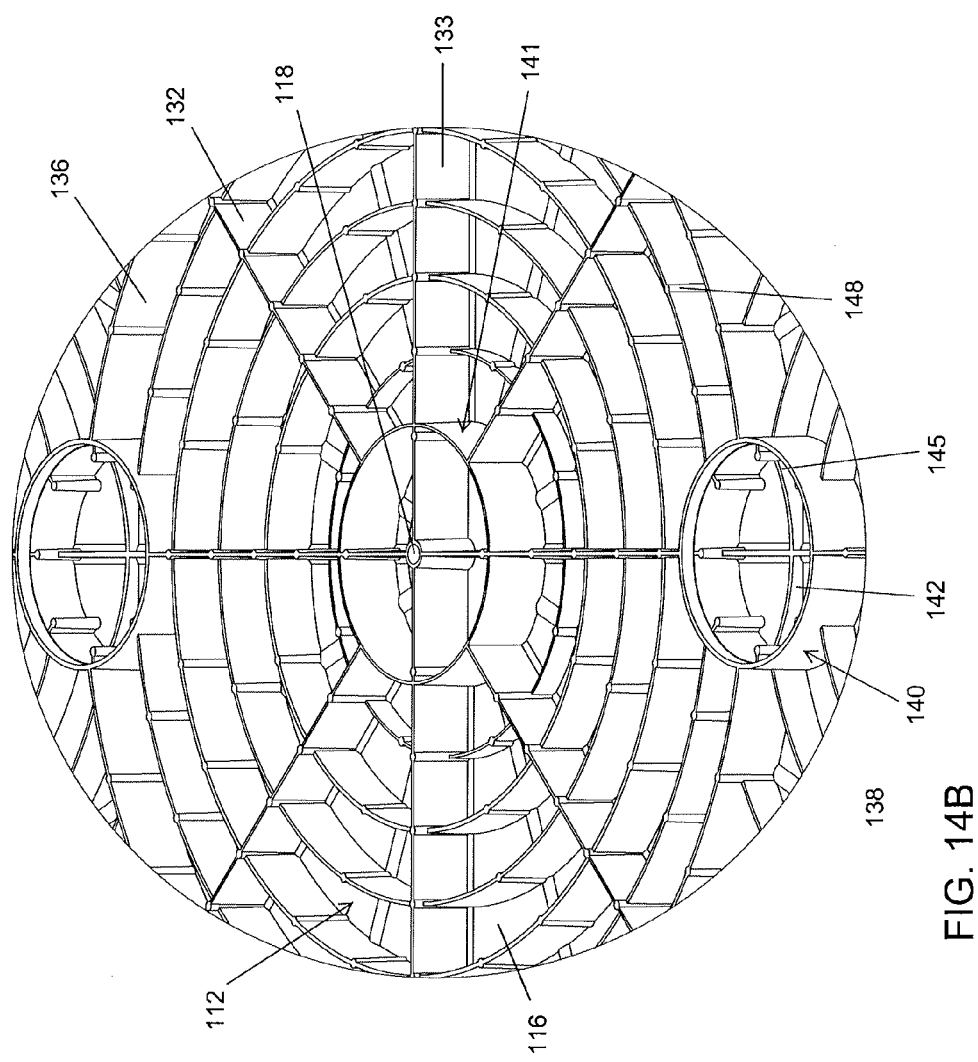
FIG. 14B is an enlarged bottom perspective view of the equipment pad (circled in FIG. 14A) in accordance with the second embodiment of the present invention.

As shown in FIGS. 6 and 7, the equipment pads 10 are nestable when stacked to form a stack 28 because the side walls 22 are flared outwardly and the height of the reinforcing network 30 of reinforcing ribs is less than the height of the side walls 22.

With reference to FIGS. 8-14, a second embodiment of a molded equipment pad 110 comprises an equipment support deck 112 having a deck top surface 114 and a deck bottom surface 116, side walls 122 having internal surfaces 124 and external surfaces 126, and an underlying network 130 of reinforcing ribs attached to the bottom surface 116 of the deck 112.

The equipment support deck 112 is generally rectangular with a center point 118 generally equidistant from the side walls 122. The equipment support deck 112 may also be other geometric shapes including but not limited to square, triangular, hexagonal, octagonal, circular, or elliptical. The top surface 114 of the deck 112 is generally planar. The four side walls 122 are attached to the edges of the deck 112 and extend downwardly. The four side walls 122 are joined at their edges to form corners 120 of the equipment pad 110.

As shown in FIGS. 9, 11, 13B, and 14B, the network 130 of reinforcing ribs is attached to the bottom surface 116 of the deck 112 and occupies the space between the side walls 122. The network 130 of reinforcing ribs includes segments of straight radial ribs 132 that extend from side walls 122 toward the center point 118 and segments of straight radial ribs 133 that extend from the corners 120 toward the center point 118. The network 130 of reinforcing ribs also includes segments of a series of concentric arc-shaped ribs 136 that are centered on the center point 118. The concentric arc-shaped ribs 136 intersect the straight radial ribs 132 and 133. As the concentric arc-shaped ribs 136 are positioned further from the center point 118, the height of the concentric arc-shaped ribs 136 increases to provide greater strength in the longer segments of the concentric arc-shaped ribs 136 between the straight radial ribs 132 and 133. For example, the outermost segment 136A of the concentric arc-shaped ribs 136 has a greater height than the innermost segment 136F with the segments 136A-136F gradually decreasing in height as the segments become shorter between the straight radial ribs 132 and 133. In this second embodiment, the outermost segments 136A of the concentric arc-shaped ribs 136 do not intersect the internal surface 124 on the side walls 122. Instead, the network 130 of reinforcing ribs includes segments of opposing arc-shaped ribs 138 that are centered on the corners 120 of the pad 110. The opposing arc-shaped ribs 138 also have varying heights depending on the length of the segments of the opposing arc-shaped ribs 138. For example, opposing arc-shaped ribs at 138A, 138B, and 138C decrease in height as the length of the segment decreases.

With continuing reference to FIGS. 9, 11, 13B, and 14B, the network 130 of reinforcing ribs further includes distributed circular hubs 140 and a center hub 141. In the embodiment shown in FIGS. 9 and 11, the center circular hub 141 is centered on the center point 118 of the network 130 of reinforcing ribs, and the four distributed hubs 140 are each located in the four quadrants of the network 130 of reinforcing ribs. With reference to FIGS. 9, 11, 13B, and 14B, the straight radial ribs 133 extended through and intersect the distributed hubs 140, and therefore reinforce the walls of the distributed hubs 140. Inside the distributed hubs 140 the straight radial ribs 133 are of reduced height because the reinforcement of the deck 112 by the distributed hubs 140 reduces the reinforcement requirements of the straight radial ribs 133 inside the distributed hubs 140. In addition, hub cross ribs 142 are positioned at essentially right angles to the segments of the radial ribs 133 inside the distributed hubs 140. The hub cross ribs 142 lend additional support to the deck 112 inside the distributed hubs 140. The hub cross ribs 142 are of reduced height because of the support provided by the distributed hubs 140 themselves. The hub cross ribs 142 and the segments of the straight radial ribs 133 inside the distributed hubs 140 have increased height or gussets 144 where the hub cross ribs 142 and the segments of the straight radial ribs 133 intersect the distributed hubs 140 to add additional strength to the intersection. The segments of the radial ribs 133 inside the center circular hub 141 are the same height as the walls of the center circular hub 141. The segments of the radial ribs 133 outside the center circular hub 141 are the same height as the walls of the center circular hub 141. The straight radial ribs 132 are the same height as the wall of the center circular hub 141 along their length.

The straight radial ribs 133 intersect the corners 120, the opposing arc-shaped ribs 138, the concentric arc-shaped ribs 136, the distributed circular hubs MO, and the center circular hub 141. The opposing arc-shaped ribs 138 intersect the internal surface 124 of the side walls 122, the straight radial ribs 133, the concentric arc-shaped ribs 136, and the distributed hubs 140 located in each of the four quadrants of the equipment pad 110. The concentric arc-shaped ribs 136 intersect the straight radial ribs 133, the straight radial ribs 132, the opposing arc-shaped 138, and the distributed hubs 140. Where the ribs, the sidewalls, and the hubs intersect, gussets, such as gussets 145 inside the distributed hubs 140 and gussets 147 where the opposing arc-shaped ribs 138 meet the side walls 122, strengthen the intersections. In addition, post-shaped fillets, such as fillets 146 strengthen the intersection between concentric arc-shaped ribs 136, opposing arc-shaped ribs 138, straight radial ribs 132 and 133. The post shaped fillets 146 also have openings to accept anti-vibration rubber bumpers (not shown). Additional post-shaped fillets, such as fillets 148, may be placed at points along the length of the ribs to provide additional structural strength.

Figure 25:
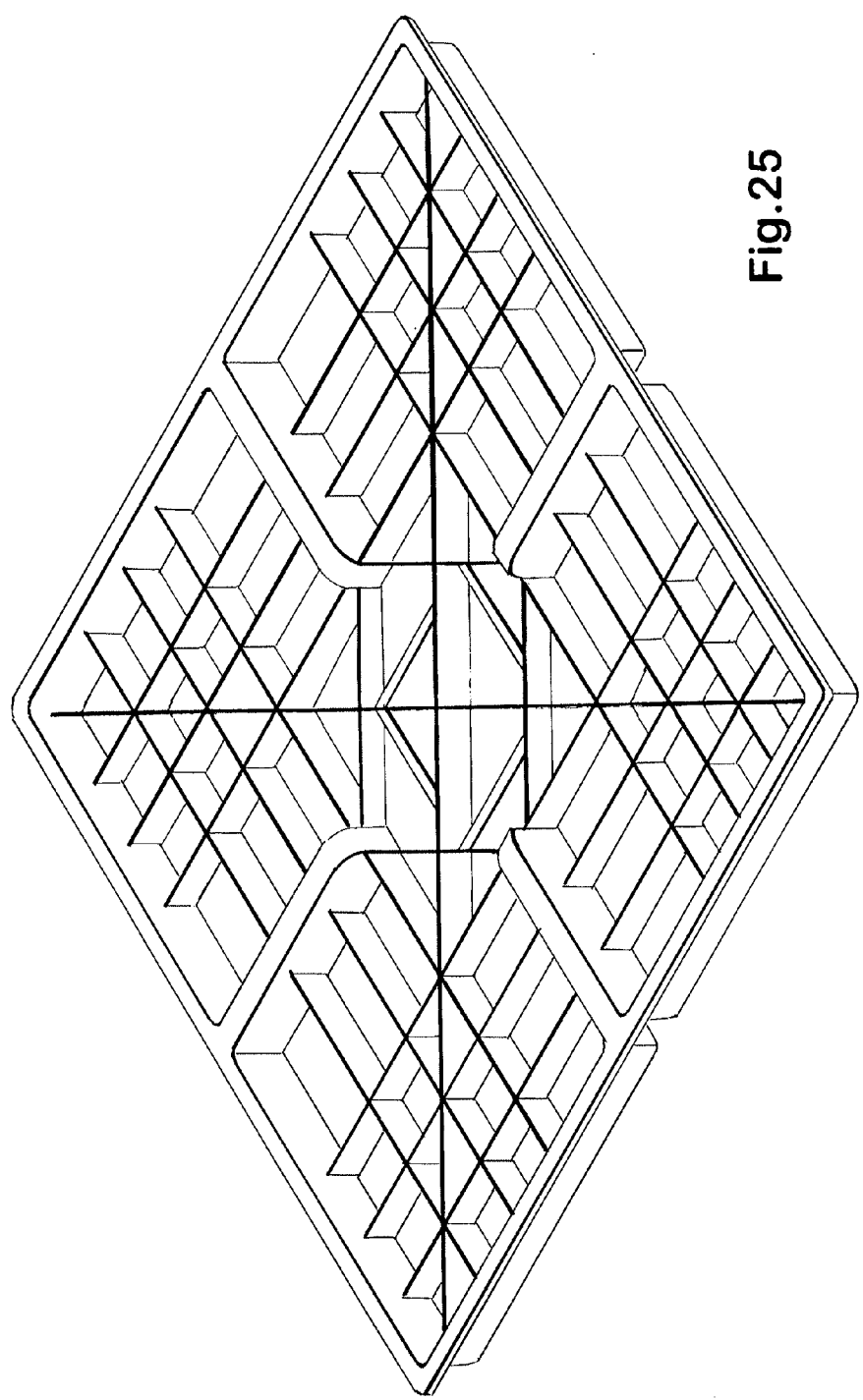
FIG. 25 is a bottom perspective view of a competitive equipment pad, Brand A.
Figure 26:
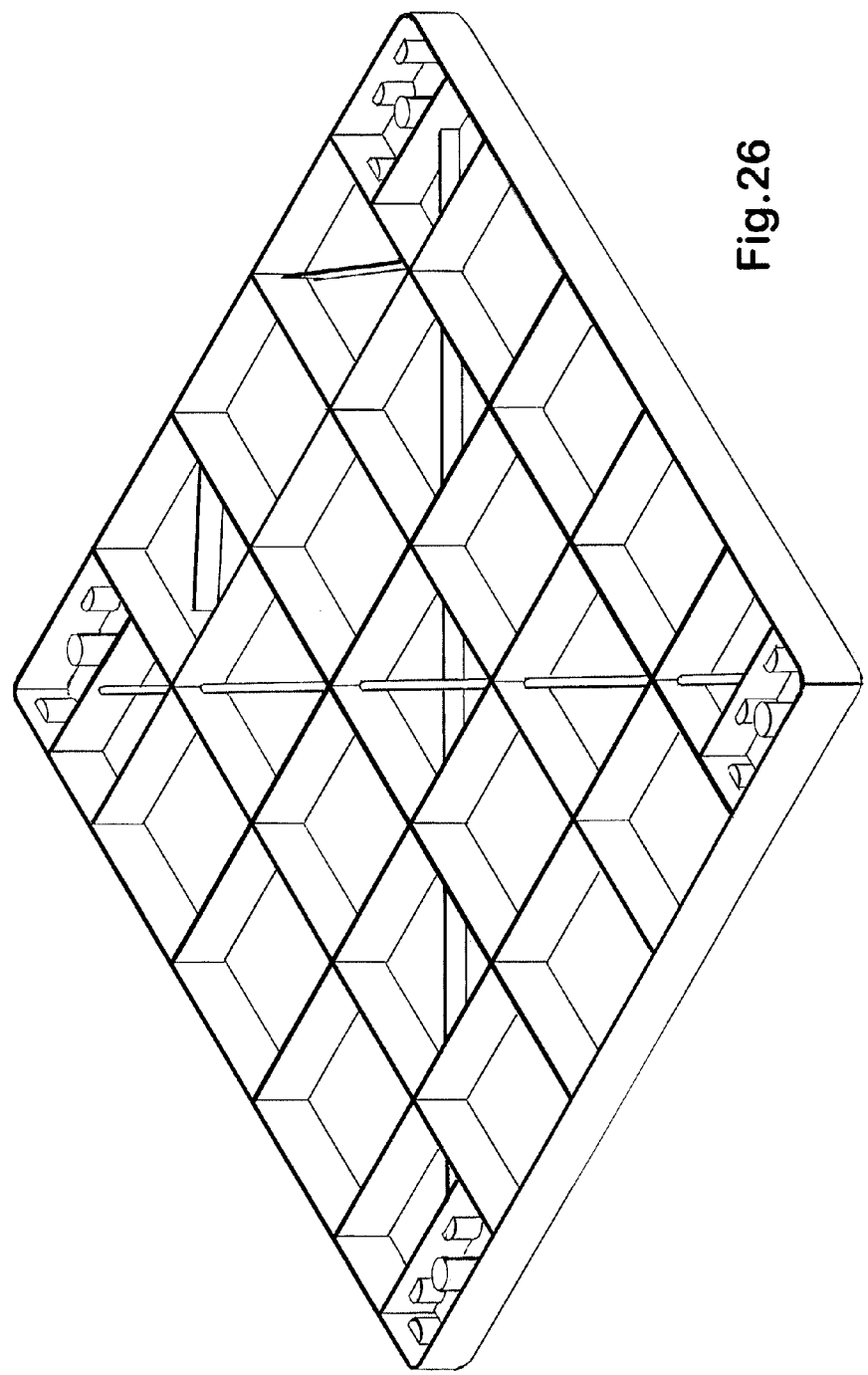
FIG. 26 is a bottom perspective view of a competitive equipment pad, Brand B.
Figure 27:
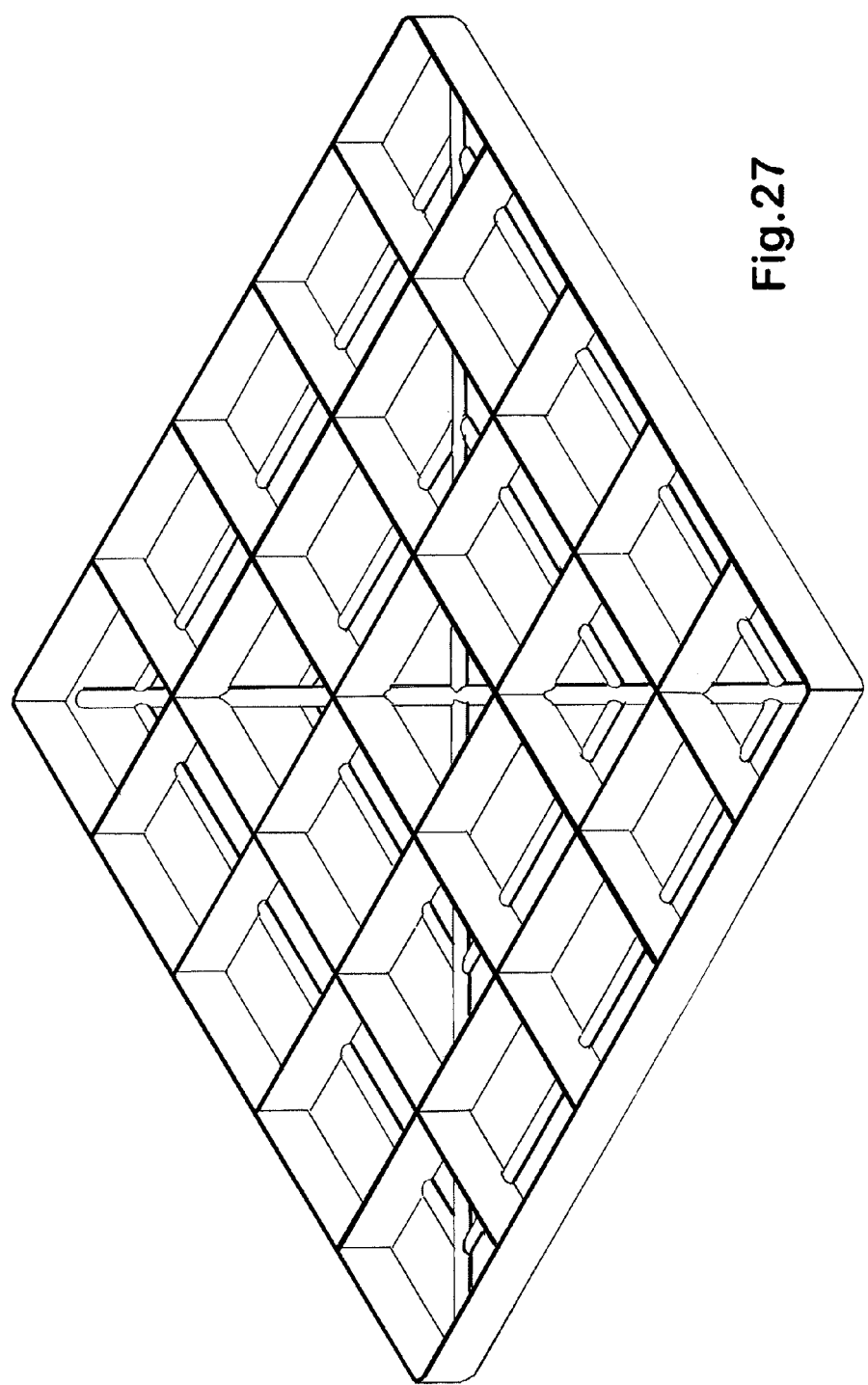
FIG. 27 is a bottom perspective view of a competitive equipment pad, Brand C.

The equipment pad 110 in accordance with the second embodiment of the present invention has a top deck 112 that is twice as stiff (measured by maximum deflection at a fixed load) as conventional pads with a deck that is more than twice as thick. The invention thus results in an equipment pad that is lighter with increased structural strength by using less polymer material. Three conventional mold equipment pads, Brands A, B, and C, are illustrated in FIGS. 25, 26, and 27, respectively. Table 1 sets forth the relevant deflections of each of the equipment pads including an equipment pad 110 in accordance with the second embodiment of the present invention.

TABLE 1

| Pad Model | Max Deflection (mm) w/150 lb Load |
| --- | --- |
| Brand A | 0.236 |
| Brand B | 0.057 |
| Brand -C | 0.048 |
| Second Embodiment of the Present Invention (FIGS. 8-14) | 0.022 |

With reference to FIGS. 15 and 16, a third embodiment of a molded equipment pad 210 comprises an equipment support deck 212 having a deck top surface (not shown) and a deck bottom surface 216, side walls 222 having internal surfaces 224 and external surfaces 226, and an underlying network 230 of reinforcing, corner originating arc-shaped ribs 236. The reinforcing, corner originating arc-shaped ribs 236 originate at each of the four corners 220 and arch toward the center point 218 of the bottom surface 216 of the equipment pad 210. Each of the corner originating arc-shaped ribs 236 constitutes a segment of a circle having its center centered on the midpoint of each side wall 222 and lying outside of the bounds of the equipment pad 210. While FIGS. 15 and 16 show four corner originating arc-shaped ribs 236, additional concentric arc-shaped ribs may be added to the bottom surface 216 of the support deck 212 to add additional strength if necessary.

With reference to FIGS. 17 and 18, a fourth embodiment of a molded equipment pad 310 comprises an equipment support deck 312 having a deck top surface (not shown) and a deck bottom surface 316, side walls 322 having internal surfaces 324 and external surfaces 326, and an underlying network 330 of reinforcing, sinusoidal arc-shaped ribs 336. The reinforcing, sinusoidal arc-shaped ribs 336 are composed of a series of arc-shaped segments, such as segments 336A and 336B. The sinusoidal arc-shaped ribs 336 extend across the width of the space between two opposing side walls 322A and 322B. While FIGS. 17 and 18 show a series of substantially parallel sinusoidal arc-shaped ribs 336 extending in one direction across the bottom surface 316 of the equipment pad 310, additional sinusoidal-shaped ribs 336 maybe added to the bottom surface 316 of the support deck 312 at essentially right angles to the sinusoidal arc-shaped ribs 336 shown in FIGS. 17 and 18.

With reference to FIGS. 19 and 20, a fifth embodiment of a molded equipment pad 410 comprises an equipment support deck 412 having a deck top surface (not shown) and a deck bottom surface 416, side walls 422 having internal surfaces 424 and external surfaces 426, and an underlying network 430 of reinforcing, concentric arc-shaped ribs 436 with an irregular undulating curvature. The reinforcing, concentric arc-shaped ribs 436 are centered on the center point 418 of the support deck 412. The concentric arc-shaped ribs 436 constitute a series of segments, such as repeating segments 436A, 436B, and 436C. While FIGS. 19 and 20 show three concentric arc-shaped ribs 436 with irregular undulating curvature, additional concentric arc-shaped ribs 436 may be added to the bottom surface 416 of the support deck at 412 to add additional strength if necessary.

With reference to FIGS. 21 and 22, a sixth embodiment of a molded equipment pad 510 comprises an equipment support deck 512 having a deck top surface (not shown) and a deck bottom surface 516, side walls 522 having internal surfaces 524 and external surfaces 526, and an underlying network 530 of reinforcing, concentric arc-shaped ribs 536 with a segmented curvature. The reinforcing, concentric arc-shaped ribs 536 with the segmented curvature are centered on the center point 518 of the support deck 512. The concentric arc-shaped ribs 536 comprise a series of segments, such as repeating segments 536A and 536B. While FIGS. 21 and 22 show three concentric arc-shaped ribs 536 with the segmented curvature, additional concentric arc-shaped ribs 536 may be added to the bottom surface 516 of the support deck 512 to add additional strength if necessary.

With reference to FIGS. 23 and 24, a seventh embodiment of a molded equipment pad 610 comprises an equipment support deck 612 having a deck top surface (not shown) and a deck bottom surface 616, side walls 622 having internal surfaces 624 and external surfaces 626, and an underlying network 630 of reinforcing ribs attached to the bottom surface 616 of the deck 612.

The equipment support deck 612 is generally rectangular with generally square sections 612A and 612B. Each of the sections 612A and 612B has center points 618A and 618B respectively. The equipment support deck 612 may also be other geometric shapes, including but not limited to square, triangular, hexagonal, octagonal, circular, or elliptical. The top surface (not shown) and the bottom surface 616 of the deck 612 are generally planar. The four side walls 622 are attached to the edges of the deck 612 and extend downwardly. The four side walls 622 are joined at their edges to form corners 620 of the equipment pad 610.

As shown in FIGS. 23 and 24, the network 630 of reinforcing ribs is attached to the bottom surface 616 of the deck 612 and occupies the space between the side walls 622. The network 630 of reinforcing ribs includes a series of concentric arc-shaped ribs 636A and 636B that are centered on the center points 618A and 636B respectively and radiate outwardly toward the side walls 622. As the concentric arc-shaped ribs 636A and 636B are positioned further from the center points 618A and 636B, the height of the concentric arc-shaped ribs 636A and 636B increases to provide greater strength in the longer segments of the concentric arc-shaped ribs 636A and 636B. In this seventh embodiment, the outermost segments of the concentric arc-shaped ribs 636A and 636B do not intersect the internal surface 624 on the side walls 622. Instead, the network 630 of reinforcing ribs includes segments of corner opposing arc-shaped ribs 638A and 638B that are centered on the corners 620 of the pad 610. The corner opposing arc-shaped ribs 638A and 638B are of varying heights depending on the length of the segments of the corner opposing arc-shaped ribs 638A and 638B. The network 630 of reinforcing ribs also includes segments of side opposing arc-shaped ribs 638C that are centered on the sides 622 of the pad 610. The side opposing arc-shaped ribs 638C are of varying heights depending on the length of the segments of the side opposing arc-shaped ribs 638C.

As shown FIGS. 23 and 24, the concentric arc-shaped ribs 636A and 636B intersect the side opposing arcs-shaped ribs 638C but do not intersect the corner opposing arc-shaped ribs 638A and 638B nor do the concentric arc-shaped ribs 636A and 636B intersect the side walls 622. The seventh embodiment, however, can be modified so that the concentric arc-shaped ribs 636A and 636B, the side opposing arcs-shaped ribs 638C, and the corner opposing arc-shaped ribs 638A and 638B intersect each other. Further, radial ribs passing through the center points 618A and 618B may be added to the network 630 of reinforcing ribs.

While this invention has been described with reference to preferred embodiments thereof, it is to be understood that variations and modifications can be affected within the spirit and scope of the invention as described herein and as described in the appended claims.

We claim:

1. A molded equipment pad comprising:
   a. a continuous top deck, having a planar top surface, a bottom surface, a center point, edges, and corners, for supporting a piece of equipment on the planar top surface;
   b. side walls extending downwardly from the edges of the top deck; and
   c. an underlying network of reinforcing ribs attached to the bottom surface of the top deck, the network including a series of concentric reinforcing arc-shaped ribs attached to the bottom surface of the top deck that are centered on the center point of the top deck and that radiate outwardly toward the side walls of the equipment pad, wherein the series of reinforcing concentric arc-shaped ribs that are centered on the center point of the top deck radiate outwardly short of the side walls of the equipment pad and wherein the underlying network of reinforcing ribs further includes a series of opposing arc-shaped ribs that are attached to the bottom surface of the top deck, that are centered on the corners of the top deck, and that extend to intersect with the concentric arc-shaped ribs that are centered on the center point of the top deck.

2. The molded equipment pad of claim 1, wherein the underlying network of reinforcing ribs of the molded equipment pad further includes reinforcing radial ribs attached to the bottom surface of the top deck and extending outwardly on a radial line from the center point of the top deck toward the side walls.

3. A molded equipment pad comprising:
   a. a continuous top deck, having a top surface, a bottom surface, a center point, edges, and corners, for supporting a piece of equipment on the planar top surface;
   b. side walls extending downwardly from the edges of the top deck; and
   c. an underlying network of reinforcing ribs attached to the bottom surface of the top deck including a series of concentric arc-shaped ribs attached to the bottom surface of the top deck, centered on the center point of the top deck, and radiating outwardly toward the side walls of the equipment pad with the outermost arc-shaped ribs intersecting the sidewalls, wherein the underlying network of reinforcing ribs of the molded equipment pad further includes cylindrical hubs attached to the bottom surface of the top deck.

4. The molded equipment pad of claim 3, wherein the underlying network of reinforcing ribs of the molded equipment pad further includes reinforcing radial ribs attached to the bottom surface of the top deck and extending outwardly on a radial line from the center point of the top deck toward the side walls.

5. A molded equipment pad comprising:
   a. a continuous top deck, having a top surface, a bottom surface, a center point, edges, and corners, for supporting a piece of equipment on the planar top surface;
   b. side walls extending downwardly from the edges of the top deck; and
   c. an underlying network of reinforcing ribs attached to the bottom surface of the top deck including a series of concentric arc-shaped ribs attached to the bottom surface of the top deck, centered on the center point of the top deck, and radiating outwardly toward the side walls of the equipment pad with the outermost arc-shaped ribs intersecting the sidewalls, wherein the underlying network of reinforcing ribs further includes a series of opposing arc-shaped ribs that are attached to the bottom surface of the top deck, that are centered on the corners of the top deck, and that extend to intersect the concentric arc-shaped ribs that are centered on the center point of the top deck.

6. The molded equipment pad of claim 5, wherein the underlying network of reinforcing ribs of the molded equipment pad further includes reinforcing radial ribs attached to the bottom surface of the top deck and extending outwardly on a radial line from the center point of the top deck toward the side walls.

7. A molded equipment pad comprising:
   a. a continuous top deck, having a top surface, a bottom surface, a center point, edges, and corners, for supporting a piece of equipment on the planar top surface;
   b. side walls extending downwardly from the edges of the top deck; and
   c. an underlying network of reinforcing ribs attached to the bottom surface of the top deck including a series of concentric arc-shaped ribs attached to the bottom surface of the top deck, centered on the center point of the top deck, and radiating outwardly toward the side walls of the equipment pad with the outermost arc-shaped ribs intersecting the sidewalls, wherein intersections between the reinforcing arc-shaped ribs and the side walls include gussets resulting from adding height to the reinforcing arc-shaped ribs at the intersections with the side walls.

8. The molded equipment pad of claim 7, wherein the underlying network of reinforcing ribs of the molded equipment pad further includes reinforcing radial ribs attached to the bottom surface of the top deck and extending outwardly on a radial line from the center point of the top deck toward the side walls.

9. A molded equipment pad comprising:
   a. a continuous top deck, having a top surface, a bottom surface, a center point, edges, and corners, for supporting a piece of equipment on the planar top surface;
   b. side walls extending downwardly from the edges of the top deck; and
   c. an underlying network of reinforcing ribs attached to the bottom surface of the top deck including a series of concentric arc-shaped ribs attached to the bottom surface of the top deck, which arc-shaped ribs are centered on the center point of the top deck and radiate outwardly toward the side walls of the equipment pad with the outermost arc-shaped ribs intersecting the sidewalls and the underlying network including reinforcing radial ribs attached to the bottom surface of the top deck and extending outwardly on a radial line from the center point of the top deck toward the side walls, wherein the reinforcing arc-shaped ribs have segments with heights and lengths between the radial ribs, and the height of a segment increases as the length of the segment between the radial ribs increases.

10. The molded equipment pad of claim 9, wherein the underlying network of reinforcing ribs of the molded equipment pad further includes cylindrical hubs attached to the bottom surface of the top deck.

11. A molded equipment pad comprising:
   a. a continuous top deck, having a planar top surface, a bottom surface, a center point, edges, and corners, for supporting a piece of equipment on the planar top surface;
   b. side walls extending downwardly from the edges of the top deck; and
   c. an underlying network of reinforcing ribs attached to the bottom surface of the top deck, the underlying network includes a series of concentric reinforcing arc-shaped ribs attached to the bottom surface of the top deck, which arc-shaped ribs are centered on the center point of the top deck and radiate outwardly toward the side walls of the equipment pad, and the underlying network includes reinforcing radial ribs attached to the bottom surface of the top deck and extending outwardly on a radial line from the center point of the top deck toward the side walls, wherein the reinforcing arc-shaped ribs have segments with heights and lengths between the radial ribs, and the height of a segment increases as the length of the segment between the radial ribs increases.

12. A molded equipment pad comprising:
   a. a continuous top deck, having a planar top surface, a bottom surface, a center point, edges, and corners, for supporting a piece of equipment on the planar top surface;
   b. side walls extending downwardly from the edges of the top deck; and
   c. an underlying network of reinforcing ribs attached to the bottom surface of the top deck, the underlying network includes a series of concentric reinforcing arc-shaped ribs attached to the bottom surface of the top deck, which arc-shaped ribs are centered on the center point of the top deck and radiate outwardly toward the side walls of the equipment pad, wherein the underlying network of reinforcing ribs of the molded equipment pad further includes cylindrical hubs attached to the bottom surface of the top deck.

13. The molded equipment pad of claim 12, wherein the underlying network of reinforcing ribs of the molded equipment pad further includes reinforcing radial ribs attached to the bottom surface of the top deck and extending outwardly on a radial line from the center point of the top deck toward the side walls.

* * * * *